United States Patent [19]

Heskett

[11] 4,238,325
[45] * Dec. 9, 1980

[54] FLUID TREATING APPARATUS AND METHOD

[75] Inventor: Don E. Heskett, Villa Park, Ill.

[73] Assignee: Fluid Power Research, Inc., Windsor, Wis.

[*] Notice: The portion of the term of this patent subsequent to Jun. 1, 1993, has been disclaimed.

[21] Appl. No.: 943,771

[22] Filed: Sep. 20, 1978

Related U.S. Application Data

[60] Continuation of Ser. No. 845,129, Oct. 25, 1977, abandoned, which is a continuation of Ser. No. 659,381, Feb. 19, 1976, abandoned, which is a division of Ser. No. 370,235, Jun. 15, 1973, Pat. No. 3,960,721.

[51] Int. Cl.³ ............................................. B01D 15/04
[52] U.S. Cl. ..................................... 210/678; 210/35; 210/275; 210/284
[58] Field of Search .................. 210/20, 35, 275, 277, 210/278, 283, 284, 290, 317

[56] References Cited

U.S. PATENT DOCUMENTS

| | | | |
|---|---|---|---|
| 2,304,453 | 12/1942 | Gudmundsen | 210/437 |
| 3,180,825 | 4/1965 | Couvreur et al. | 210/350 |
| 3,458,436 | 7/1969 | Martinola et al. | 210/35 |
| 3,509,998 | 5/1970 | Pellett et al. | 210/98 |
| 3,529,726 | 9/1970 | Keenan | 210/447 |
| 3,570,520 | 3/1971 | Sodi | 210/88 |
| 3,960,721 | 6/1976 | Heskett | 210/35 |

Primary Examiner—Ivars C. Cintins
Attorney, Agent, or Firm—Lockwood, Dewey, Alex & Cummings

[57] ABSTRACT

A fluid treating apparatus and method are provided which employ finely subdivided surface active particles arranged in loose bed form and confined within a treating tank by means which prevent the escape of such particles but which permits fluid flow therethrough at a high rate with a minimum pressure drop. In an important embodiment, the apparatus and method of this invention are particularly directed to the treatment of water with fine mesh ion cation exchange resin particles of below 50 mesh size, and preferably 100 to 200 mesh or smaller, measured on a dry basis. This apparatus and method provides removal of polyvalent metal ions such as calcium and magnesium to soften the water and, unexpectedly, of chlorine, hydrogen sulfide, iron, including colloidal iron particles, bacteria and other taste and odor forming contaminants to an extent far superior than that of conventional water softening units even where such units are provided with special auxiliary treating devices such as, for example, activated carbon filters. In the described embodiment, the operation of all valves is completely hydraulic and regeneration is automatically provided when a predetermined quantity of water has been treated, however, important aspects of the present invention also find advantageous utility in fluid treating apparatus and methods wherein valve operation is manually, electromechanically, or otherwise regulated.

2 Claims, 15 Drawing Figures

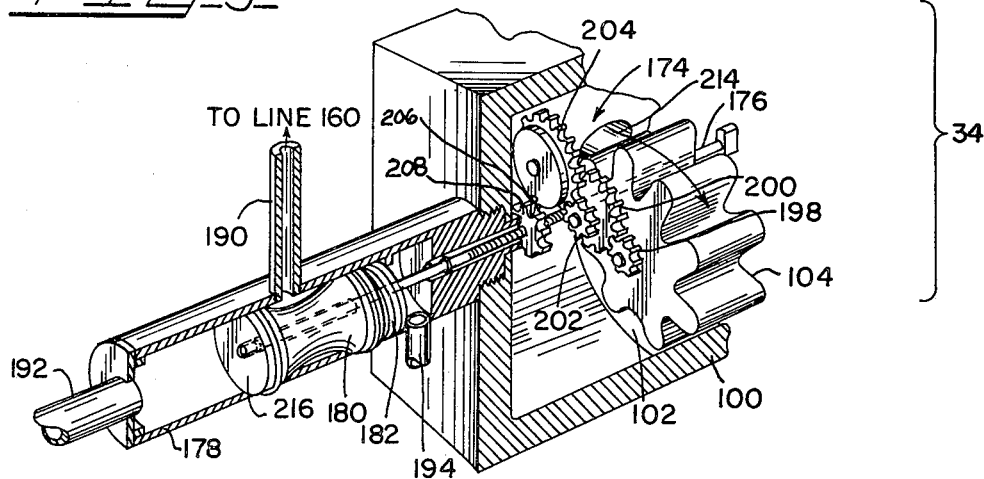
Fig-5-
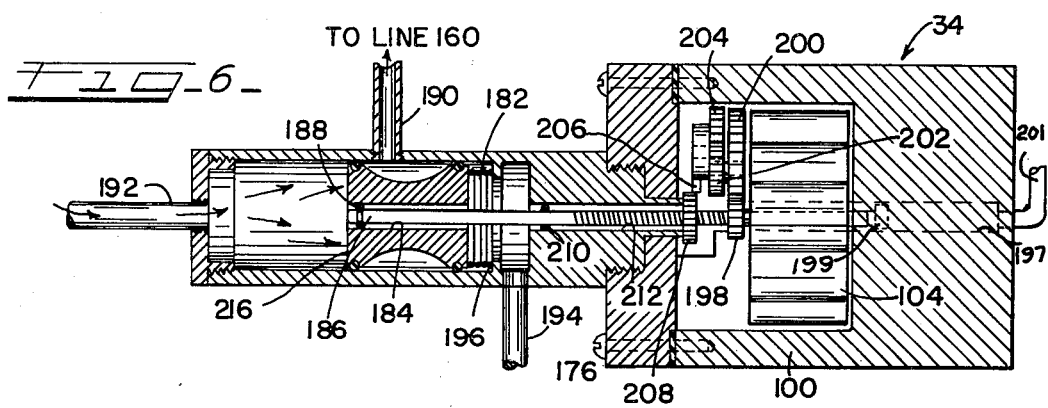
Fig-6-
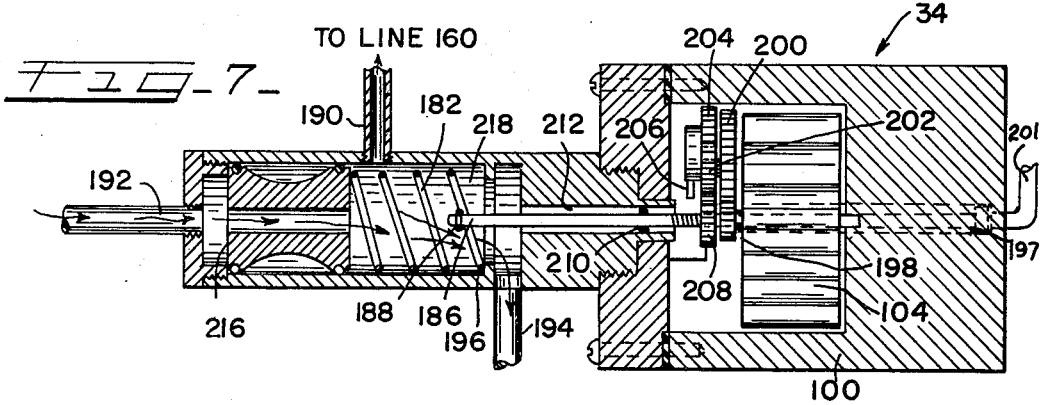
Fig-7-

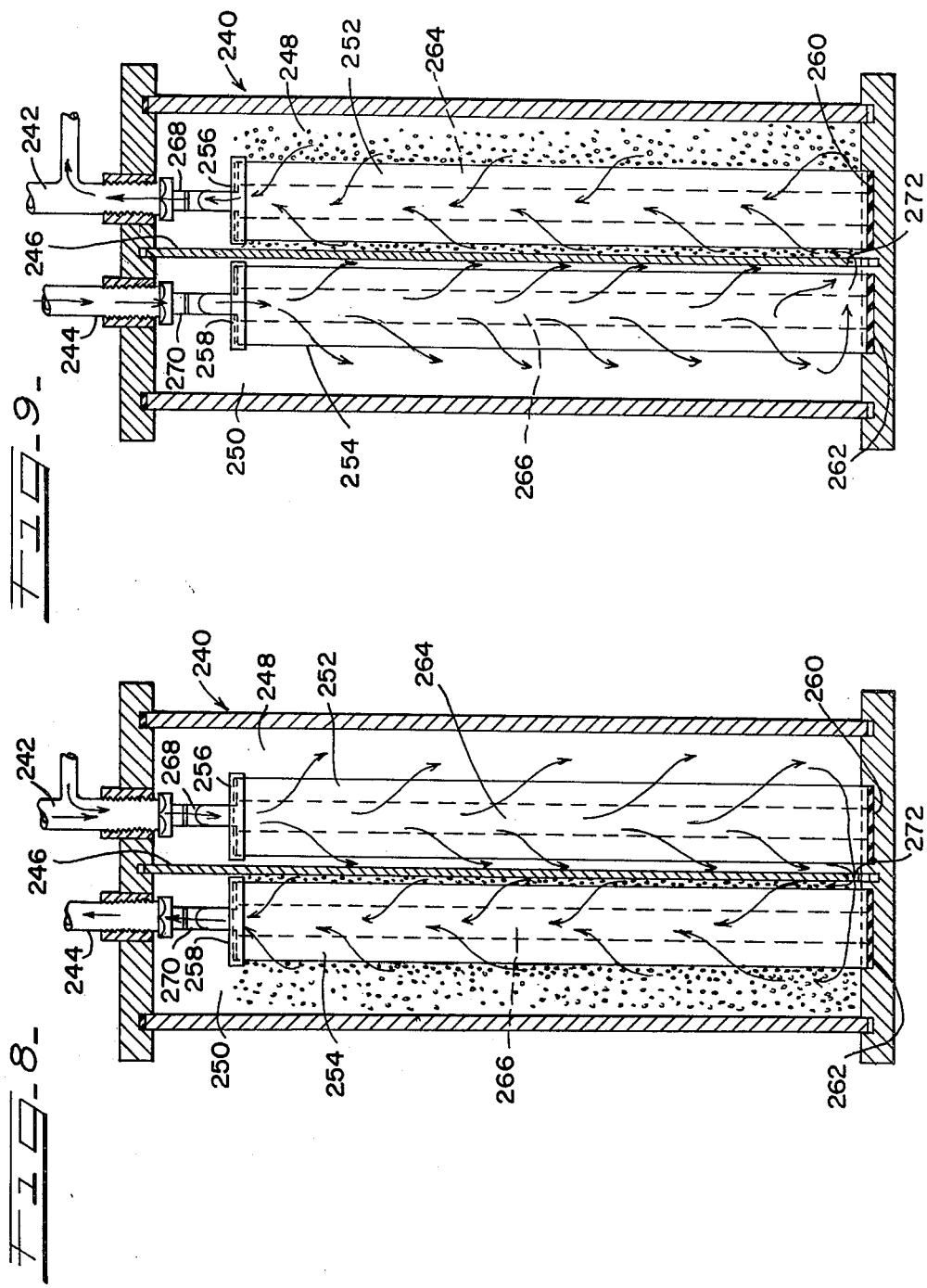

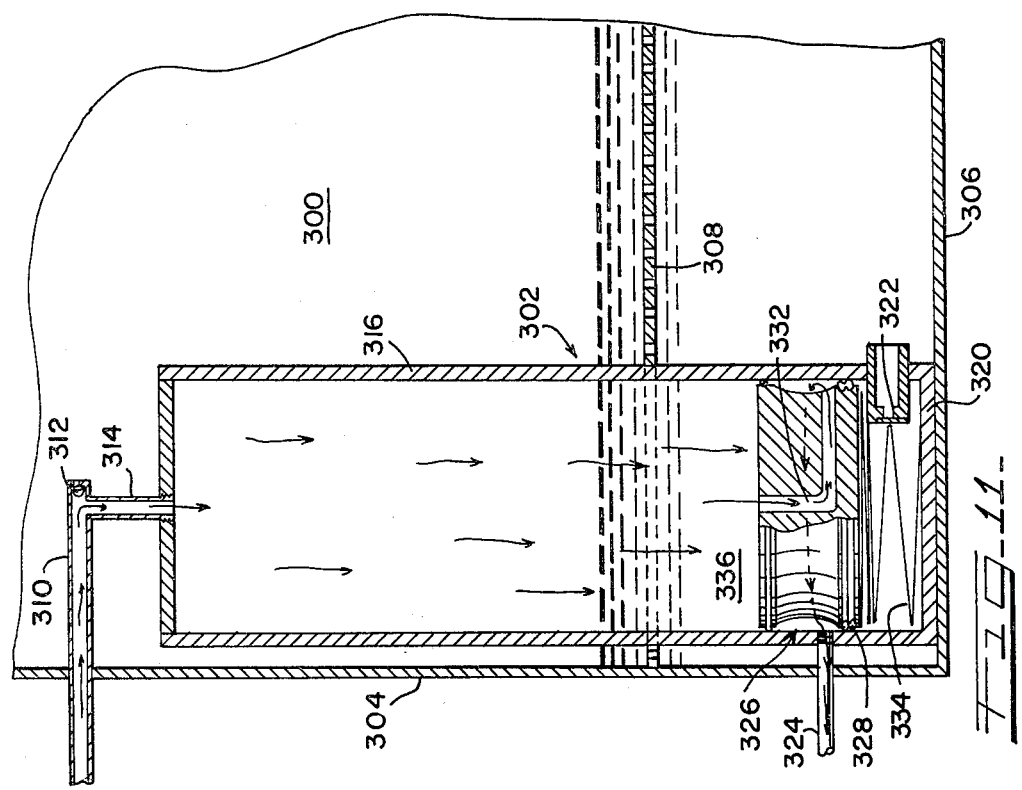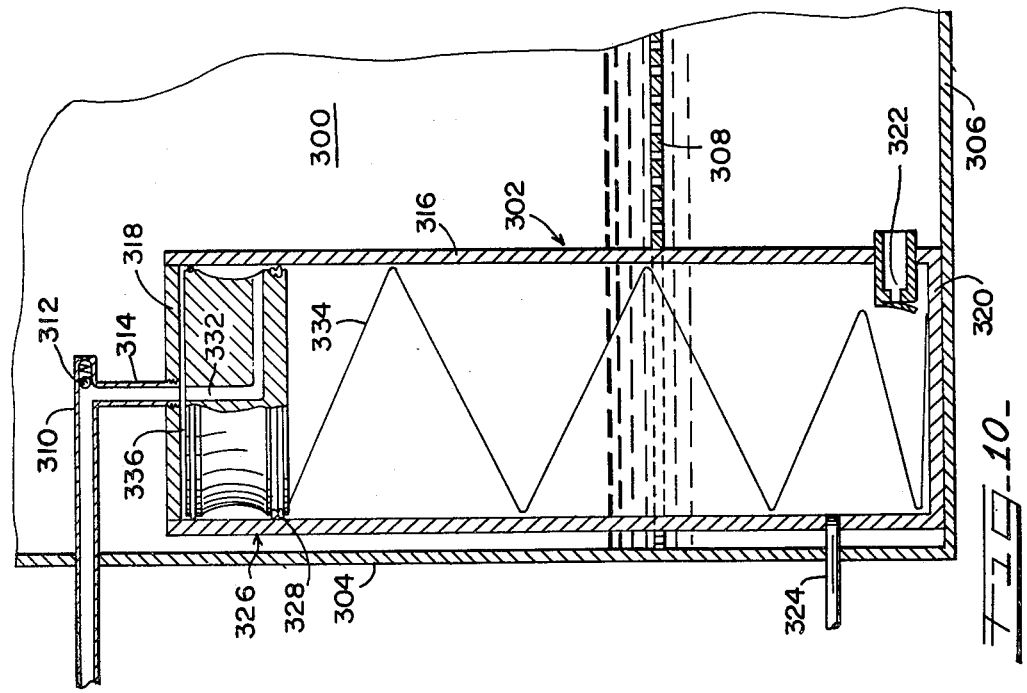

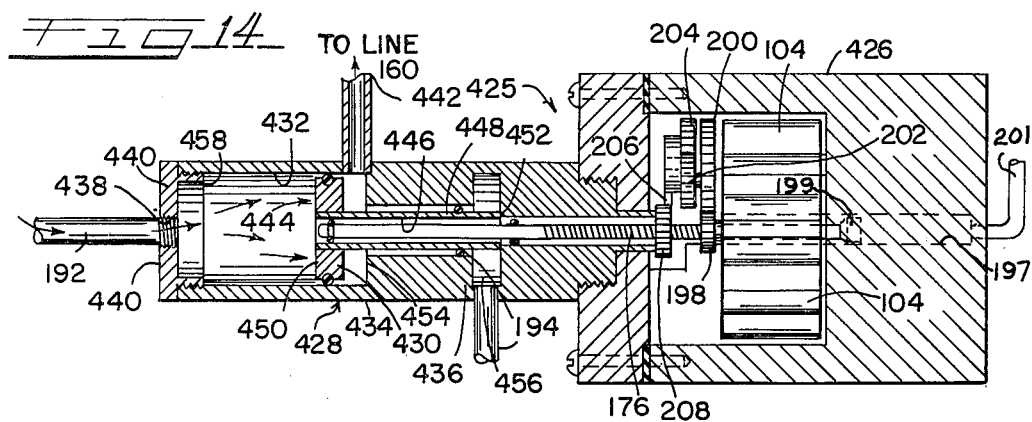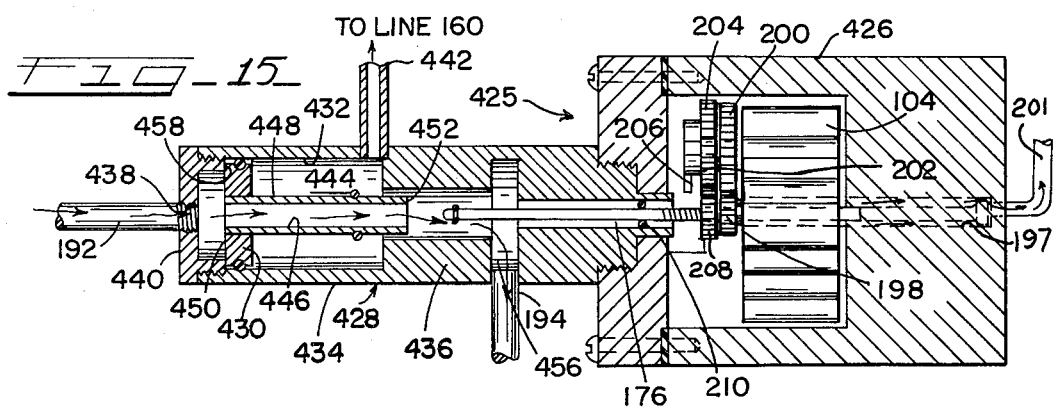

FLUID TREATING APPARATUS AND METHOD

This is a continuation of application Ser. No. 845,129, filed Oct. 25, 1977, which, in turn, is a continuation of application Ser. No. 659,381, filed Feb. 19, 1976, both now abandoned, which is a division of applicaton Ser. No. 370,235, filed June 15, 1973, now U.S. Pat. No. 3,960,721.

BACKGROUND AND DESCRIPTION OF THE INVENTION

The present invention generally relates to fluid treating and, more particularly, to apparatus and methods which are especially adapted for providing improved treatment of fluids. Although capable of other important uses, this invention finds advantageous utility in the treatment of water to remove therefrom polyvalent mecal ions such as calcium and magnesium by the exchange of sodium ions for such polyvalent metal ions and, by means of the same treating medium, namely, finely subdivided ion exchange resin particles, also provides the removal of chlorine, hydrogen sulfide, iron, including colloidal iron particles, bacteria and other taste and odor forming contaminants from water being treated in accordance therewith.

In the field of fluid treating, and particularly in the field of treating water for industrial, commercial, and domestic use, a number of systems have been proposed, some or all of which have certain undesirable characteristics, drawbacks or disadvantages associated therewith.

In the past, water softeners have been proposed wherein various electric timers or the like have been utilized to indicate the need for regeneration and to initiate such regeneration. These devices are, of course, not responsive to use and, as such, will trigger regeneration at fixed time intervals irrespective of whether the ion exchange material is exhausted. Still other water softeners have operated strictly on a manual basis, with indications of the need for regeneration of the ion exchange medium being indicated strictly by subjective reaction of the water user to the apparent softness, flavor, or other characteristics of the water then being used.

Certain other prior art water softeners have been characterized by the presence of an unduly slow regeneration cycle, caused either by the amount of nature of the ion exchange material or by other factors which tend to require an increased residence time in contact with the brine for regeneration. Still other water softeners of the prior art have used ion exchange materials which were unduly restrictive of water flow and hence were characterized by large pressure drops thereacross, which required long residence times and accordingly, large physical dimensions, or which simply required large quantities of ion exchange material to insure the activity over a reasonable period of time and to insure that an adequate job of softening could be done in the presence of relatively high flow rates.

The present invention overcomes the undesirable characteristics, drawbacks and disadvantages of the prior art by providing a fluid treating apparatus and method which employ finely divided surface active particles arranged in a loose bed and confined within a treating tank by means which prevent the escape of such particles but which, at the same time, permit fluid flow therethrough at a high rate and with a minimum pressure drop. In this regard, an important embodiment of the present invention is directed to a water treating device and method which employ fine mesh ion exchange resin particles to provide hardness and contaminant removal to an extent which was heretofore thought to be unachieveable. In this regard, an important aspect of the present invention involves the discovery that fine mesh cation exchange resin particles of below 50 mesh size, and preferably 100 to 200 mesh or smaller, measured on a dry basis, will, in addition to providing hardness removal at an extremely high rate of exchange, also provide for removal of chlorine, hydrogen sulfide, iron, including colloidal iron particles, bacteria and other taste and odor forming contaminants.

Another feature of the present invention involves the conjoint use of dual loose particles beds of ion exchange material, arranged in series, with aggregate particles in one bed being specially adapted to provide relatively inefficient ion exchange when the flow of water therethrough is in one direction and relatively efficient ion exchange when the flow of water therethrough is in the opposite direction, such arrangement providing an efficient and economical means for eliminating so-called reverse exchange in a water softener system wherein service flow through the bed of ion exchange material takes place in one direction and both regeneration and rinsing take place in the opposite direction.

Another aspect of the present invention involves the provision of an apparatus for treating water which receives flow of untreated water, circulates that flow of untreated water through an ion exchange bed, and then returns the flow to a water tap or other outlet. In particular, this apparatus is so constructed that, after treatment of a given volume of water, the apparatus automatically switches to an ion exchange regeneration and rinse or reverse flow mode, whereby the ion exchange material is treated with brine to replenish its ion exchange capacity and then rinsed with fresh water.

Another aspect of the present invention is the construction and arrangement of a regeneration supply system wherein a measured quantity of regenerant fluid such as, for example, brine, is held in a supply tank for positive and rapid feeding to the ion exchange or treatment tank during regeneration, and wherein the supply of such regenerant in the tank is then replenished with a predetermined volume of freshly made regenerant, without action or attention by the operator or user.

Another feature of the present invention is the provision of an apparatus for treating water wherein all operation of that apparatus takes place entirely mechanically and fluidically, that is, an apparatus which does not require the presence of electrical or other external control signals in order to begin or continue operation, or to initiate or complete the regeneration cycle, all switching being done by fluid forces inherent in the static water pressure and under the influence of forces created by or during the flow of water.

Another feature of the present invention is the provision of an apparatus for treating water which utilizes a bed of fine mesh ion exchange resin particles which bed functions to collect particulate contaminants during service flow and is characterized by improved flushing properties as a result of increased porosity during regeneration thereof.

Another feature of the present invention is the provision of an apparatus for treating water utilizing a bed of fine mesh ion exchange resin particles which apparatus is characterized by regeneration and rinse cycles of short duration, particularly when compared to commercially available water softeners of conventional design and which utilizes substantially less water for rinsing and regeneration than is required by such conventional water softener devices.

It is, therefore, an important object of the present invention to provide an improved fluid treating apparatus and method.

Another object of the invention is to provide a fluid treating apparatus which includes a bed of finely subdivided ion exchange particles, arranged in a loose bed form and confined within a treating tank by means preventing the escape therefrom but permitting water flow therethrough at a high rate with minimum pressure drop.

Another object is to provide a novel method of removing chlorine, hydrogen sulfide, iron, including colloidal iron particles, bacteria, other taste and odor forming contaminants, and other foreign materials from a treated fluid such as water, and to provide an apparatus for carrying out this method.

Another object is to provide a fluid treating apparatus for water or other fluids which includes a treatment tank having therein a first bed of aggregate particles of a very fine subdivided particle size and a second bed of aggregate particles arranged in series therewith and adapted to provide relatively inefficient ion exchange when the flow of water therethrough is in one direction and relatively efficient ion exchange when the flow of water therethrough is in the opposite direction, such beds being separated from each other and constructed and arranged so as to prevent reverse ion exchange in service flow following regeneration of the beads.

Another object is to arrange such dual beds so that they may be manufactured and sold as a single unit, in prepackaged form, or otherwise.

Another object is to provide a water softener or other fluid treating apparatus which is characterized by the use of dual beds of ion exchange materials arranged so as to provide for complete treatment of water flowing therethrough, as well as to reduce pressure drop thereacross to a minimum.

Still another object is to provide a fluid treating apparatus having means for confining a loose bed of aggregate ion exchange particles to a desired area within a treatment tank, and having means permitting expansion and contraction of the bed of particles as their ion exchange capacity is depleted and replenished.

Another object of the invention is to provide an apparatus which includes means for feeding brine or other regenerating fluid to the ion exchange material area under positive pressure from the water supply being softened.

Another object is to provide an apparatus having a large brine make-up tank and means associated therewith for selectively premeasuring a desired volume of brine for passage through and regeneration of the ion exchange material under controlled conditions.

Another object is to provide such an apparatus which includes means for selectively measuring all or a portion of the fluid flow therethrough, and for using such flow measurement as a means for determining the time at which regeneration of the ion exchange material is initiated.

Another object is to provide an apparatus which includes a number of valves for controlling fluid flow, with the valves being arranged so as to be biased to a closed position or permitted to be opened solely in response to the fluid pressure acting on such valves.

Another object is to provide a fluid treating device which includes a novel arrangement of fluid treating tanks wherein a bed of finely subdivided ion exchange material may be confined for effective use.

Another object is to provide a fluid treating apparatus which include a novel apparatus for transferring a measured quantity of brine from a storage or make-up area to a measuring or metering area and thence to the treating area for regeneration of the brine.

Another object of the present invention is to provide a fluid treating apparatus which utilizes ion exchange resin particles which apparatus is characterized by reduced rinse water and regenerant requirements.

Another object of the present invention is to provide an improved method and apparatus for treating fluids wherein particulate contaminants contained in the fluid are collected in a bed of fine mesh fluid treating materials wherein flushing of collected particulate contaminants from such bed is improved by selective size reduction of the fluid treating materials resulting in increased porosity in the bed.

These objects and other objects and advantages of the invention are accomplished by providing fluid treating apparatus which includes means for confining a loose bed of very finely subdivided ion exchange aggregate particles to a fluid treating area, means for causing fluid to flow through such area for treatment, means for permitting storing and making up a supply of fluid for regenerating the ion exchange material, and means for passing a predetermined amount of regenerating fluid through the treating tank after treatment of a predetermined amount of water, with regeneration taking place after treatment of a predetermined quantity of fluid in the apparatus.

BRIEF DESCRIPTION OF THE DRAWINGS

FIG. 5 is a perspective view, partly in section, showing the construction of one form of flow measuring apparatus forming a part of the invention;

FIG. 6 is a vertical sectional view of the flow measuring apparatus of FIG. 5, showing the valve spool portion thereof in one portion of use;

FIG. 7 is a vertical sectional view similar to that of FIG. 6, but showing the valve spool in another position of use;

FIG. 8 is a vertical sectional view of an alternate form of fluid treating tank adapted for use with the invention, showing the tank being used in the fluid treating portion of the cycle;

FIG. 9 is a vertical sectional view similar to that of FIG. 8, showing the apparatus of FIG. 8, and illustrating the flow of fluid therethrough in the regenerating mode;

FIG. 10 is a vertical sectional view of one modified form of brine measuring and feeding apparatus useful with the invention;

FIG. 11 is a vertical sectional view of the apparatus of FIG. 10, showing the piston and valve portion thereof in another position of use;

FIG. 14 is a vertical sectional view of a modified form of fluid flow measuring device according to the invention, showing this valve spool in one position of use; and FIG. 15 is a vertical sectional view of the modified form of valve of FIG. 14, showing the spool thereof in another position of use.

Figure 1:
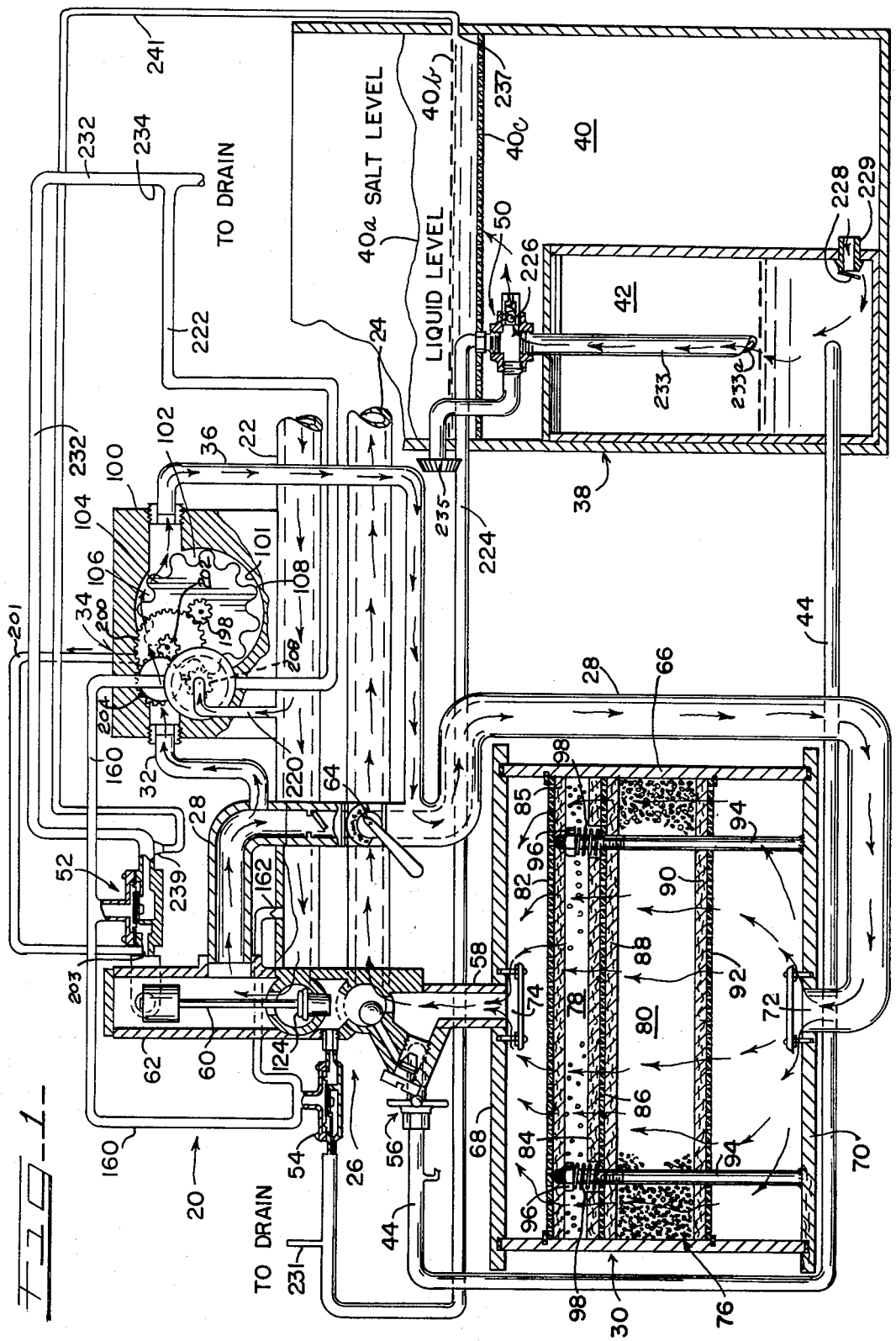
FIG. 1 is a view, partially in elevation and partially in section, showing certain of the elements of one form of fluid treating apparatus constructed according to the invention, and showing the operation of the apparatus in a service of fluid treating mode of operation.

Although an important aspect of the present invention is directed to the treatment of water with a loose bed of fine mesh ion exchange resin material, it will be appreciated that the method and apparatus of this invention may also find advantageous utility in the treatment of a variety of different fluids with various different materials. For purposes of illustration therefore, this invention will be described by reference to an embodiment wherein water is the fluid being treated, a fine mesh cation ion exchange resin material such as, for example, "Dowex 50W" (a strongly acid cation exchange resin characterized by a nuclear sulfonic acid active group and marketed by The Dow Chemical Company of Midland, Michigan) is the principal material employed in such treatment, and wherein conditions of intermittent or non-continuous flow are ordinarily experienced. Accordingly, it will be appreciated that the present invention has application to a wide range of fine mesh ion exchange materials which include: strongly acidic cation exchange resins wherein a matrix composed of a copolymer having a major portion of styrene and a minor portion of divinylbenzene is sulfonated resulting in the presence of nuclear sulfonic active groups therein, which typically are regenerated with sodium chloride solutions of from 10 to 26 percent concentration by weight but which also may be regenerated with other regenerants such as 4 to 10 percent solutions of HCl or 2 to 8 percent solutions of $H_2SO_4$; strongly basic anion exchange resins wherein, for example, a styrene-divinylbenzene copolymer is subjected to chloromethylation and amination to produce an ion exchange resin having active trimethyl benzene ammonium groups; weakly basic anion exchange resins; weakly acidic cation exchange resins; and other ion exchange materials which can be utilized in fine mesh form in accordance with the principles of the present invention to achieve the benefits and advantages thereof.

As used herein, the term "fine mesh" denotes ion exchange particles having a mesh size of below 50 mesh and preferably of from 100 to 200 mesh and smaller, based on U.S. Standard screen sizes and measured on a dry basis. For example, a mesh size of below 50 mesh (dry basis) for spherical ion exchange particles would correspond to a particle size diameter of below 0.0117 inches or 0.297 mm or 297 microns. Correspondingly, a 100 to 200 mesh size particle size distribution (dry basis) for generally spherical particles would correspond to a particle diameter size of from 0.0059 to 0.0029 inches or 0.149 to 0.074 mm or 149 to 74 microns. Similarly, a particle size of from 200 to 400 mesh (dry basis) would, for spherically shaped particles, correspond to a particle diameter of from 0.0029 to 0.0015 inches or 0.074 to 0.038 mm or 74 to 38 microns.

In the illustrated embodiment wherein strongly acid cation exchange resin bonds having a general spherical shape and a mesh size of from 100 to 200 mesh (dry basis) are employed, a screen analysis revealed that the following approximate particle size distribution was present:

| Mesh Size | Percent |
| --- | --- |
| 80 mesh or larger | 0.8 |
| −80 +100 | 78.7 |
| −100 +140 | 16.5 |
| −140 +170 | 2.3 |
| −170 +200 | 1.7 |
| Total | 100.0 |

These fine mesh ion cation exchange resin materials function to soften the water by removal of "hardness" therefrom through the exchange of sodium ions for objectional divalent ions such as, for example, calcium, magnesium and barium. As is known, these ion exchange resin materials can be regenerated through the use of ordinary salt after the capacity of the ion exchange material has been depleted. In accordance with an important aspect of the present invention, however, as previously noted, it has been discovered that these fine mesh ion exchange resin materials will also effectively remove other objectionable and undesirable flavors, odors, colors and other substances from the water or other fluid being treated, including, for example, chlorine, hydrogen sulfide, taste and odor contaminants, and effectively reduces the alkalinity of the fluid being treated. In addition, by reason of the reduced particle size of these ion exchange resin materials, an interstitial spacing is provided in the main bed which is effective to remove particulate materials such as, for example, bacteria and iron.

Figure 2:
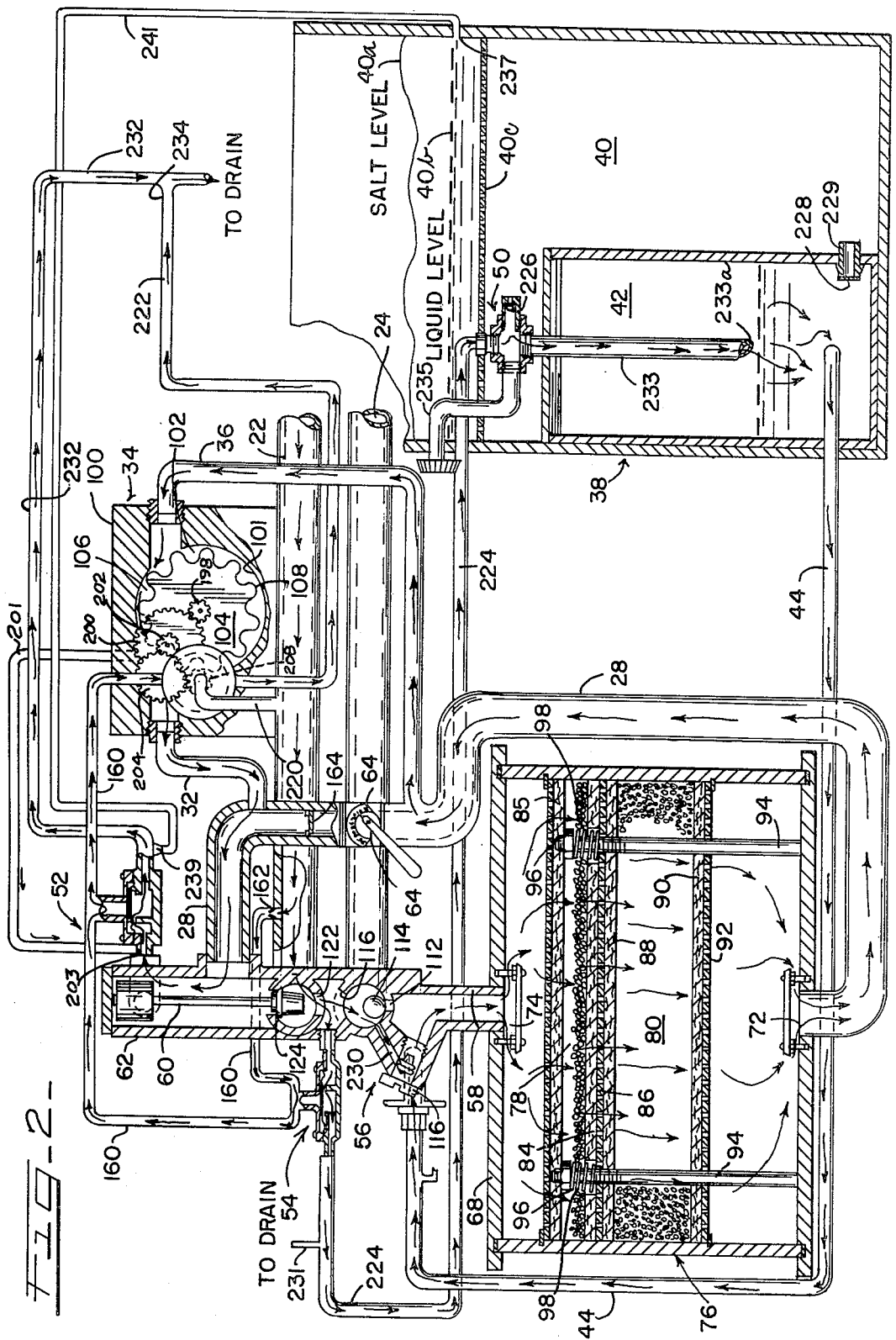
FIG. 2 is a view of the apparatus of FIG. 1, showing the apparatus operating in the regeneration and rinsing or backwashing mode.
Figure 3:
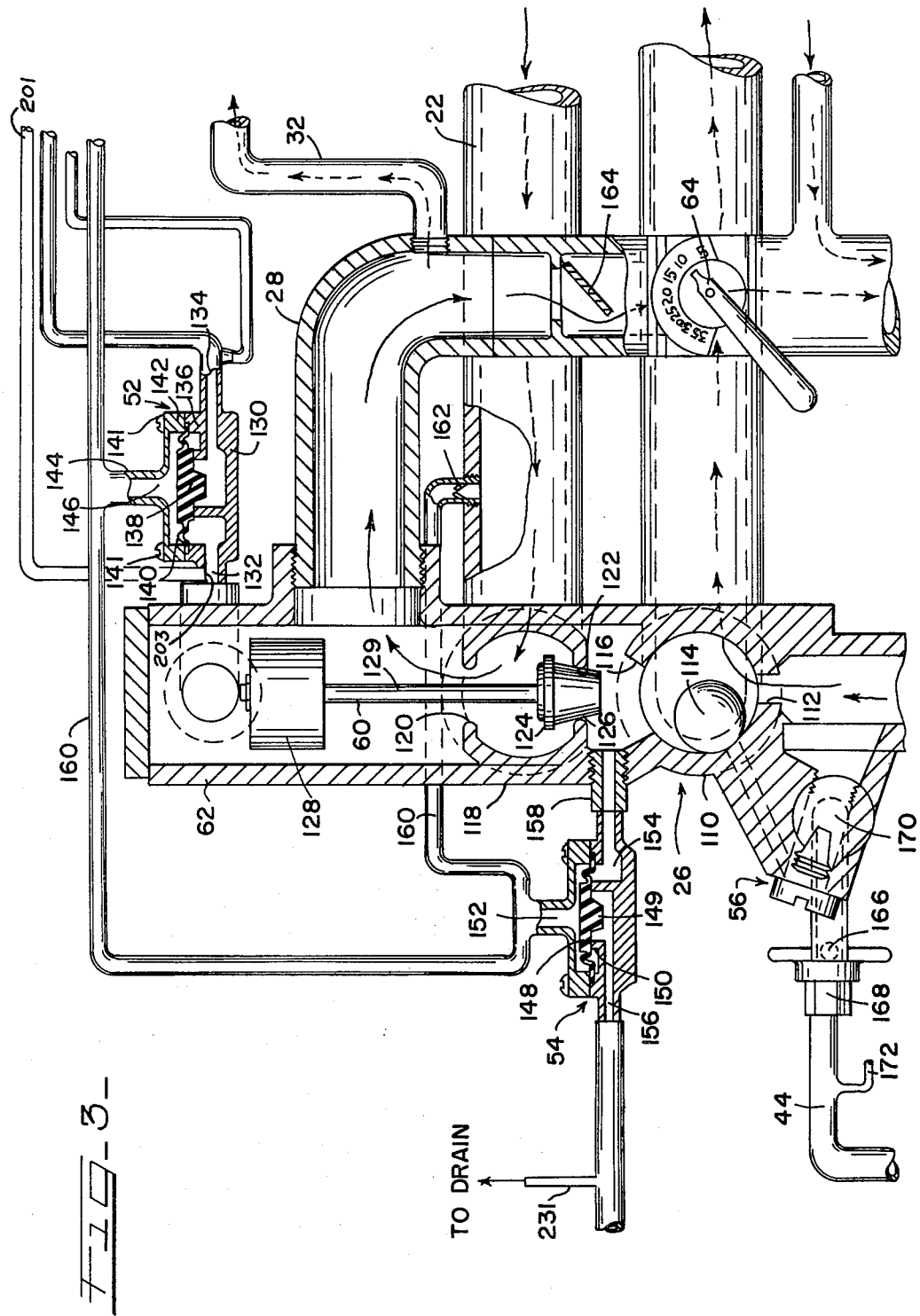
FIG. 3 is a sectional view, on an enlarged scale, showing a portion of the apparatus of FIG. 1, operating in the service or fluid treatment mode.
Figure 4:
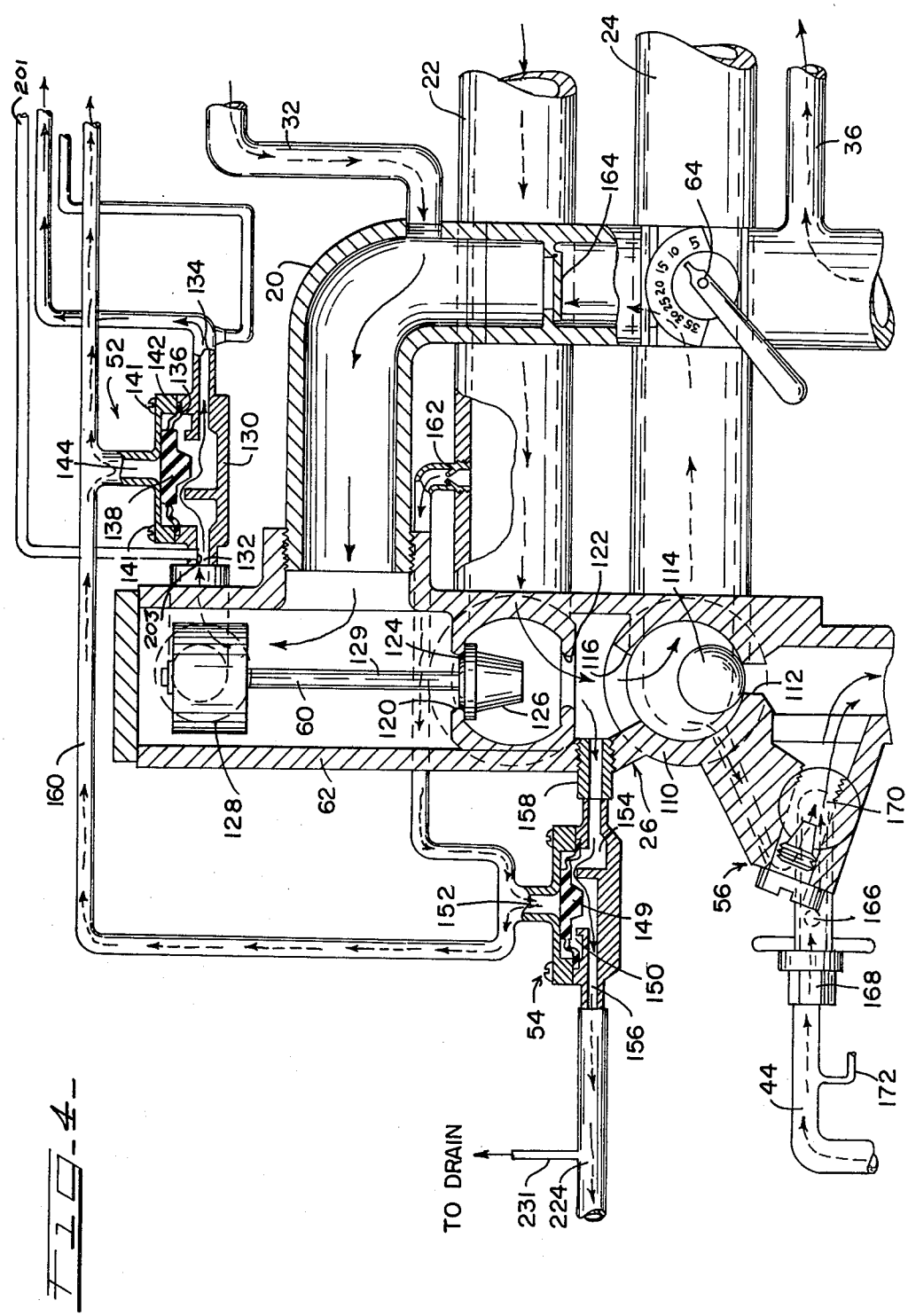
FIG. 4 is an enlarged vertical sectional view of a portion of the apparatus of FIG. 2, showing the apparatus in the regeneration mode.

Inasmuch as one form of the apparatus is adapted for operation in two principal modes, certain of the drawings, for purposes of clarity, show the fluid treating apparatus in one mode and other drawings show the same treating apparatus in another mode. For example, FIGS. 1 and 3 are similar to FIGS. 2 and 4, with FIGS. 1 and 3 showing the principal portions of the apparatus of the invention when the apparatus is being operated in the fluid treating or service mode, while FIGS. 2 and 4 show the regeneration mode. Accordingly, only the positions of the various valves and other components are different as between the service mode of FIGS. 1 and 3 and the regeneration mode of FIGS. 2 and 4. As will also be understood, the regeneration mode involves both regeneration of the ion exchange material by passage of brine or other material thereover, and a subsequent rinsing operation, both of which occur prior to switching to the original or service mode of operation.

Referring now to the drawings, FIG. 1 shows the invention to be typically embodied in an apparatus generally designated 20 for treating a fluid such as water, and shows that the apparatus includes a main inlet pipe 22, a main outlet pipe 24, a main valve assembly 26 for directing fluid, in the treating mode of operation, through a treating inlet pipe 28, to a treating tank 30, and then again through the main valve assembly 26 and to the outlet pipe 24. FIG. 1 also shows that means in the form of a pipe 32 is provided for directing some or all of the water flowing into the pipe 28 through a combination meter and flow control valve assembly 34, from which the fluid passes through pipe 36 into the treating tank inlet pipe 28. Accordingly, it will be appreciated that, if desired, the illustrated embodiment could be modified to provide for discharge of the entire flow in pipe 28 into pipe 32.

Means in the form of an assembly 38 having a brine makeup or storage tank 40 and a brine metering and supply tank 42 are also provided, so that brine may be caused, as will be described later, to flow through the line or pipe 44 into the fluid treating tank 30, for the purpose of regenerating the aggregate particles in the treating area 48 inside the tank 30. The unit also includes a valve assembly generally designated 50 associated with the brine metering and supply tank 42, and a drain valve assembly 52 which is normally closed during service operation but which opens to permit brine and rinse water which is passed through the treating tank 30 to be discharged as waste. A regeneration water flow control valve 54 normally prevents flow of water under service conditions to the brine tank 42 but during regeneration, the valve 54 opens to cause flow of a predetermined volume of previously made up brine solution into and through line 44. Further, a brine flow control valve assembly 56 is provided to control the flow of brine and rinse water into the neck portion 58 of the tank 30.

A vertically movable service control valve assembly 60 is disposed within the valve housing 62 of the main valve body 26, and a hardness control or metering bypass valve 64 is shown to be provided for purposes which will presently appear.

As shown, the fluid treating tank 30 comprises imperforate exterior sidewall 66, top and bottom walls 68, 70 and service inlet and outlet passages 72, 74 permitting flow of fluid to be treated respectively into and out of the treating tank 30. Disposed within the tank 30 is an aggregate retaining assembly generally designated 76, which, in this form of the apparatus is shown to comprise an upper chamber 78 and a lower chamber 80, the upper chamber including a foraminous or perforated top plate 82, a pair of felt or equivalent material pads 84 and 85, and an intermediate perforated plate 86 serving as the bottom of the chamber 78. The upper chamber 78 is loosely or nearly, but not tightly, filled with ion exchange resin beads which preferably are also of fine mesh size but which, if desired, may be of larger size, the purpose and function of which will be described elsewhere herein.

The lower chamber 80 is defined at its upper end by the intermediate perforated plate 86, directly beneath which is a fine mesh, felt-like pad 88. A similarly formed pad 90 is disposed at the bottom of the chamber 80, and overlies a perforated or foraminous bottom support plate 92. Tensioning means in the form of two or more rods 94 extend between the lower wall 70 of the tank 30 and into the upper chamber 78, and the rods 94 include nuts 96 or other variably positionable fasteners which act through resilient means such as the springs 98 to apply a downward force on the plate 86, in order to tightly confine the very finely subdivided resin beads in the chamber 80, and at the same time to permit limited expansion and contraction of these beads as their ion exchange capacity is increased on regeneration or depleted in use. As shown for purposes of illustration, the lower chamber 80, which contains the very fine mesh beads, has a substantial lateral or radial extent in relation to its axial thickness, in order to reduce the amount of fluid pressure drop thereacross.

The pads 84, 85, 88 and 90 are coextensive with the inside surfaces of the sidewalls 66, and are engaged snugly therewith to prevent loss of aggregate. These pads may be composed of any suitable material which will pass fluids and particulate contaminants therethrough but retain the ion exchange resin beads in chambers 78 and 80. For example, a matted wool fiber having a porosity such that it will pass particulates of 50 micron size can be used when the ion exchange beads in chambers 78 and 80 are from 100 to 200 mesh size (dry basis). It will be appreciated that the porosity of the pads can vary depending upon the size of the fine mesh ion exchange beads actually employed and that, in general, the pads 84, 85, 88 and 90 will have a porosity rating of from 25 to 75 microns. In instances wherein natural fibers such as wool are employed, the pretreatment thereof to prevent bacteria degradation is desired. Preferably, these pads are composed of polypropylene fibers since these fibers remain intact over a wide pH range and are not subject to bacteria attack. A suitable commercially available pad material is supplied by GAF Corporation under the trade designation "62 PO(15) 38".

Referring now to the metering assembly 34, it will be seen that this unit comprises a body 100 with a wall 101 defining a circular pocket or like opening 102 therein for accomodating a toothed water wheel 104 or other metering means which provides a plurality of chambers 106 therein, with the radially outermost portions 108 of the toothed wheel 104 being spaced apart only by working clearance from the wall 101. Accordingly, flow of a characteristic volume of water through pipe 32 and out pipe 36 will cause a corresponding rotation of the wheel 104. The speed reducing gears shown in FIG. 1 to be associated with the wheel 104 are described in detail elsewhere herein.

In FIG. 3, certain of the features of the valves 26, 52 and 54 and 56 are shown in greater detail. Referring first to the valve 26, it will be noted that this valve includes a lower housing portion 110 having a lower seat 112 and a ball check 114. An opening 116 is also provided at the upper end of the body portion 110. An intermediate portion 118 of the valve 26 includes upper and lower seats 120, 122 respectively, to engage the upper and lower shoulders or seating surfaces 124, 126 respectively of the valve unit 60.

A float or flow-responsive portion 128 is provided at the upper end of the stem 129 to cause movement of the valve unit 60 upwardly at the appropriate time, whereupon the shoulder 124 will close off the passage 120.

Referring now to the construction of the drain valve 52, this unit includes a body 130 having inlet and outlet passages 132, 134 therein, an annular seat 136, and a vertically movable head 130 surrounded by a diaphragm 140, with the outer margin of the diaphragm 140 locked in place in fluid-tight relation by fasteners 141 between the body 130 and the valve body cover 142. A passage 144 is formed in the cover to permit fluid to flow into the chamber 146 above the valve diaphragm 140, to control fluid flow between passages 132 and 134.

Because the area above the diaphragm 140 is greater than the area on the underside thereof, if the pressure present in chamber 146 is equal to or greater than the pressure in the inlet passage 132, the head 148 of the valve 52 will be firmly held on the valve seat 136, preventing flow of fluid into the outlet passage 134. When the force acting on the top of the diaphragm 140 falls below the force exerted upwardly thereon from the fluid therebeneath, the diaphragm moves up, permitting fluid to flow from the passage 132 through the valve body 130 and out the passage 134. Accordingly, fluid pressure in the chamber 146 acts only as a pilot or control force, and pressure in the port or passage 144 is therefore utilized only for controlling operation of the valve 54 and not for moving fluid per se.

The regeneration flow control valve 54 is of the same construction as drain valve 52, i.e., the head 149 of a diaphragm 148 is held on a seat 150 by pressure in chamber 152 to prevent fluid flow from the inlet passage 154 to the outlet passage 156. As is the case with the drain valve 52, when pressure in the chamber 152 is sufficiently reduced, pressure in the inlet passage 154 will raise the diaphragm 148 and permit fluid to flow over the seat 150 and into the outlet passage 156. A fitting 158 is provided to permit communication between the outlet passage 154 and the interior of the main valve assembly 26. In the form shown, line 160 provides pressure to chambers 144 and 152, thus permitting valves 52 and 54 to be controlled in the same way at the same time.

Referring still to FIG. 3, it will be noted that a one-way check valve 162 is provided at the junction between line 160 and the main inlet pipe 22. A one-way check valve 164 is also provided in the line or pipe 28 upstream of the hardness control valve 64.

Referring now to the brine flow control valve assembly 56, a small ball 166 is shown to be provided therein for controlling flow of fluid between passages 168 and 170, and thus for permitting flow of brine from the tank 42 through pipe 44 and into the treating tank 30. A reduced diameter drain or bleed line 172 is shown to be provided in pipe 44 near the valve 56.

Referring now to FIGS. 5–7, the meter and flow control valve assembly 34 is shown to include, in addition to the body 100, opening 102 and the wheel 104, a gear train generally designated 174, an axially extending partially threaded long rod 176, a flow control valve body 178 and a valve spool 180. As shown, a mechanical spring 182 urges the spool toward the left as shown in the drawings. A hollow passage 184 extends axially of the spool 180, and the left hand or spool end 186 of the rod 176 is received therein and kept in fluid-tight relation by seal means in the form of an O-ring 108. A top inlet 190, a side or axial inlet 192 and a common outlet 194 are provided within the valve body 170, which also includes a shoulder 196 serving as a base for the spring 102.

Referring now to the operation of the valve assembly 34, rotation of the water wheel 104 drives a first gear 198 at the rotational speed of the wheel 104, gear 200 reduces this rotational speed, and still further reduction occurs by reason of gears 202 and 204. As shown, final drive gear 204 is actually two gears in one, with one part having only a single tooth 26, and the other part having plural teeth. All teeth, however, are on the same pitch circle but tooth 206 is axially offset from the teeth on the other part thereof. A valve spool gear or final driven gear 208 moves axially with respect to the rod 176. Preferably, single tooth 206 is composed of a flexible material to avoid possible binding thereof with gear 208.

Since the rod 176 is received within a passage 212, and since the rod 176 includes inner seal means in the form of an O-ring 210, a fluid tight seal exists between the exterior of the rod 176 and the bore or passage 212.

Referring now to the operation of the combination meter and flow control valve 34, it will be assumed that fluid is flowing inwardly from line 32 (FIG. 1) to the passage 214 in the body 100, and that this fluid flow is in the direction of the arrow shown in FIG. 5. This flow causes the wheel 104 to rotate in the clockwise direction as shown in FIG. 5. As the wheel 104 rotates, the small pinion gear 198 rotates, rotating intermeshing gears 200 and the coaxially arranged pinion gear 202. This in turn causes rotation of the large rod drive gear 204, and the single tooth 206 thereon rotates at the same angular velocity. With very complete revolution of gear 204, tooth 206 advances the small rod driven gear 208 only one tooth in a direction causing relative inward or right hand rotion of the threaded rod 176. Accordingly, gear 208 is rotated at only a fraction of the rate at which it would be rotated were more than a single tooth provided on a gear 206, and consequently a great numerical reduction occurs between the number of turns of the water wheel 104 and turns of the rod drive gear 208. During the time the gear 208 is being advanced, but while the rod 176 stays within the axial bore 184 in the valve spool 180, the spool is acted upon by two separate hydraulic forces. The first, namely the force of water in the line 190, is distributed about the body of the spool 180 and does not tend to urge the spool in either axial direction. However, water supplied through port 192 acts against the end face 216 of the spool 10 and urges it to the right as shown in FIG. 6, thereby preventing flow of water through the drain port 194. However, inasmuch as continued forward rotation of the drive gear 208 gradually moves the threaded rod 176 to the right, the end portion bearing the seal 188 will eventually be withdrawn from the bore 184 in the spool 180. At this point, the force of the spring 182 urges the spool to the left, and the force of the water acting on the end face portion 216 of the spool 180 is relieved by flow of water through the passage 184 as shown by the arrows in FIG. 7. Accordingly, the water flows through port 192 into the drain port 194, and this spool movement also opens passage 190 so that water may flow therethrough and also out the drain port 194.

Referring again to FIG. 1, this action of opening port or drain 194 will be seen to relieve the pressure in line 160 serving valves 52 and 54, which, as will be described, will cause initiation of the regeneration cycle. Referring again to FIGS. 5–7, and bearing in mind that the duration of the regeneration cycle is very short with respect to that of the flow treatment cycle, it will be understood that, under conditions of regeneration, water flow in the meter 34 will occur in a direction opposite to that shown in FIG. 5, thus rotating the water wheel 104 backward, and causing the gears 198, 200, 202, 204 and 206 to rotate in the opposite direction. However, upon reverse operation, an important functional difference occurs, namely, the reverse direction rotation of single tooth 206 results in gear 208 being gradually moved to the right until it engages gear 204. The distance of travel which gear 208 undergoes before engagement with gear 204 represents a design variable which can be used as a means for regulating regeneration time and, accordingly, the quantity of regenerant supplied to the ion exchange resin contained in chambers. This moves the rod final drive gear 208 to the right and the teeth thereof engage with the teeth on gear 204, which may typically be twenty, fifty or even more times more numerous than the single tooth on gear 206. If desired, movement of gear 208 into meshing engagement with gear 204 can be assisted by the provision of a line 201 which communicates the chamber 197 with inlet 203 of valve 52. In this manner, the opening of valve 52 causes a flow of water to pass around the head portion 199 on threaded atom 176, urging the threaded atom to the right, thereby carrying gear 208 into engagement with gear 204. The water from chamber 197 passes through line 201 into inlet 203, through valve 52 and into line 232 for discharge to the drain.

Accordingly, rotation of the rod in the opposite direction, or to the left as shown in FIGS. 5–7, will occur with much greater speed relative to the speed of movement of the wheel 104. After the rod 176 has been forced to the left a distance sufficient to close the passage 184 in the spool 180, forces acting in the chamber 219 against the head 216 of the valve spool 180 will rapidly move the valve spool 180 to the right, overcoming the force of the spring 182 and stopping fluid flow through the valve body, and closing passages 190, 192.

Changing the relative durations of the recycling or regeneration flow and the service flow may be done as dictated by the condition of the water or other fluid to be treated.

Referring now again to FIGS. 1 and 3, the operation of the apparatus will be described, the assumption being made that tank 40 is filled to a predetermined level with solid salt, as generally designated by the reference numeral 40a, and that the lower portion of the tank 40 is filled with water, as generally designated by the reference numeral 40b, so as to make a substantially saturated solution of brine in the lower portion of the tank 40. As shown in FIGS. 1 and 3, a supply of salt is supported on a grate 40c which is suitably mounted in tank 40. Assuming that service water is desired to be withdrawn through the outlet pipe 24, as the tap or other valve controlled by the user (not shown) is turned on, water flows through the inlet pipe 22 as shown by the arrows, passes through the valve 26, through passage 120, and into the pipe 28. At this point, some or all of the flow is diverted to pipe 32, through the meter and valve assembly 34, and out through line or pipe 36, and then back into the pipe 28. The valve 164 will open to whatever extent is permitted by positioning of the valve 64, that is, a portion of the water appearing in the lower portion of pipe 28 will have passed through the valve 64 without having gone through the metering unit 34. In this connection, it should be pointed out that, to the extent that water flows through valves 164 and 64, the water wheel 104 will not be rotated, and the interval between regeneration cycles will be lengthened. Accordingly, constructing valve 64 as a throttle or butterfly valve to proportion the relative amounts of water flowing through the pipe 28 without flowing through pipe 32 will act as an effective hardness control.

Referring again to water in pipe 28, this untreated water passes through the openings 72 into the treating tank 30, through plate and pad 92, 90 and to the lower chamber 80 which contains the finely subdivided resin beads or other aggregate particles. The speed of ion exchange in this area is extremely rapid because of the immance surface area presented by the finely divided particles, and removal of cations from the water is almost instantaneous. Correspondingly, as discussed more fully elsewhere herein, the fine mesh ion exchange resin beads surprisingly function to remove from the water other contaminants such as, for example, chlorine, alkalinity constituents, hydrogen sulfide and taste and odor contaminants as well as particulates such as iron and bacteria. The water thus treated in chamber 80 then passes through the pad 88, the plate 86 and into and out of the upper chamber 78, where additional ion exchange material 76 is provided. Fluid flow then takes place out through passage 74 and into the service pipe 24. During this time, fluid pressure in pipe 22 is supplied through check valve 162 and pipe 160 to the passages 142, 146 respectively on valves 54, 52, keeping these valves in a closed position. Accordingly, during the service mode of operation, there is normally no flow of water outwardly of the valve 26 through passages 154 or 132, and all of the water entering through pipe 22 passes outwardly after treatment through pipe 24.

Assuming now that the wheel 104 has resolved sufficiently to free the spool 180 within the cylinder housing 178 (FIGS. 5 and 7) the spool moves to the left, permitting water flow in passages 190 and 192. The passage 190 communicates with the pipe 160 and, accordingly, pressure relieved in port 190 permits flow of service water from pipe 22 over check valve 162, into and out of line 160, and permits valves 52 and 54 to open. Passage 192 communicates with line 220, and flow to line 220 is also directed to the outlet passage 194, which communicates with a drain line or pipe 222.

Referring now to FIGS. 2 and 4, continued operation of the apparatus in the regeneration mode will be discussed. Assuming that flow of water has taken place through line 160 so as to open valves 52 and 54, the valve 60 moves upward as flow occurs out the top of the housing 62. This causes the shoulder 124 of the valve assembly 60 to engage the opening 120 in the portion 118 of the main valve body 26, thus directing flow of water in line 22 downwardly through openings 122 and 116 and into pipe 24, ball check 114 thus covering port 112. Accordingly, the flow of water, if any, through lines 22 and 24 is uninterrupted. A minor portion of the water either passing from line 22 to line 24, or standing in line 24, however, is directed through fitting 158 to passage 154 in the valve 54, and thence to the valve outlet 156, which communicates with the line 224 which terminates at the brine tank valve 50.

Flow of water through valve 54 and into valve 50 under service pressure through pipe 224 closes the openly biased ball check 226 in valve 50, directing water into the interior of the brine metering and storage tank 42 via pipe 233. Pressure therein closes the flapper or one way valve 228 at the bottom of the tank 42, and causes made-up brine to flow to and through line 44 and thence to valve 56, from which it is directed into line 58 and into the passage 74 line in the top wall 68 of the treating tank 30. As this action continues, brine from the tank 42, diluted somewhat by water coursing through passage 230 leading to valve 56, contacts the beads and exchanges the sodium ions in the brine for the calcium and other divalent metal ions previously taken on by the resin beads, forcing backwashing water through passage 72, and upwardly in pipe 28. Backward flow in pipe 28 closes check valve 164, forcing all of the water in pipe 28 through line 36 and into the metering valve assembly 34. The volume of backwashing water flowing through the valve 34 turns the water sheel 104 backward as described above starting to reposition the threaded rod 176 (FIGS. 5–7). From the valve 34, waste water passes out into pipe 32, through the upper portion of valve body 62, through now open valve 52 and outwardly into drain line 232, which communicates at 234 with the other drain line 222. Water flowing through both lines 222 and 232 is then directed to the drain. As flow continues in this mode, the volume of brine in the tank 42 is exhausted, while valves 226 and 228 remain closed, thus causing fresh water circulation or rinsing to follow movement of the charge of brine through line 44. As determined by the operation of the metering unit 34, fresh water flow continues as just described, that is, fresh water flows backwardly through the treating tank 30 through the valve assembly 34 and to the drain 232. When the rod 176 is moved axially far enough to block opening 184 in spool 180, the spool 180 moves to the right, creating back pressure in line 160. Thereupon, valves 52 and 54 close, and line pressure is removed from the brine tank 42. As water flow through valve 52 stops, the valve assembly 60 drops downwardly, assuming the position shown in FIG. 3. This closes passage 122 and again forces water to flow through passage 120, into line 28, through line 32 and into the metering unit 34.

As high pressure is removed from valve 50 in the brine metering and supply tank 42 by reason of a bleed line 231 in line 224 which communicates with the drain, the ball check valve 226 moves to an open position, and valve 228 is also opened by reason of the greater density of the salt water in the brine made-up tank 40. Thus, the brine in tank 40 flows into the tank 42 through the fitting 229 to fill the same with brine, with further flow through line 44 being prevented by reason of the closed position of the ball check 166 in valve 56. Simultaneously, the volume of brine received in tank 42 from brine make-up tank 40 displaces an equal volume of fresh water in tank 42 causing the fresh water to pass through openly biased ball check valve 226 into make-up tank 40. Since the water level 40b in tank 40 is sufficiently high so as to effect solubilization of the salt stored on the grate 40c as new brine is formed which by reason of its greater density settles to the bottom of make-up tank 40 in position for being charged to the metering and supply tank 42 when required. The solubilization of the salt will result in a raising of the liquid level in tank 40 which is, accordingly, regulated by level control outlet 237 which communicates with an inlet 239 in line 232 via line 241. In this manner, flow through line 232 such as, for example, during regeneration, results in the siphoning of excess liquid in tank 40 and the discharge thereof to drain. At this point, the apparatus has returned to the operational or service mode shown in FIG. 1 and the apparatus will then continue to operate in tis mode until the rod 176 is withdrawn, allowing the valve spool 180 to move and initiate a repeat of the regeneration cycle just described.

In accordance with an optional, but important, feature of the present invention, the quantity of brine charged to the ion exchange resin beads in a regeneration mode can be regulated by varying the elevation of the bottom open end 233a of pipe 233. As such, lowering and/or raising the pipe 233 in tank 42 also constitutes another means by which hardness adjustment can be made. In particular, flow of brine from the brine make-up tank 40 through fitting 229 into tank 42 will continue until the brine level is the brine metering and supply tank 42 contacts the bottom open end 233a of pipe 233, at which point further flow of brine therein will automatically stop. This optional feature of the present invention is important where frequent regeneration is desired even though the ion exchange resin material itself is not spent or exhausted. Typically, this occurs where the water or other fluid being treated contains large amounts of particulates which are trapped by the bed of fine mesh ion exchange material in chamber 80 of the tank 30. Accordingly, in such instances, it is important, in order to insure efficient operation of the fluid treating device, to provide for switching of the fluid treating device into the regeneration mode in order to keep the bed of ion exchange resin material from clogging. In such instances, if greater quantities of brine were used than were otherwise necessary to replenish the sodium ions lost during the preceding service cycle, the quantity of salt or brine used would be in excess of that required and accordingly result in a waste of such material. As schematically shown, this variable brine charge regulation can be provided for by means of an adjustment lever 235 which regulates the elevation of the lower end 233a of inlet pipe 233. Alternatively, this feature can also be obtained by the installation of pipes 233 having a length which provides for the desired brine charge capacity in tank 42.

An inportant and advantageous feature of the present invention as shown in the embodiment of FIGS. 1–7 concerns the maintenance in a service flow mode where there is a high rate of flow therethrough even though the metering assembly 34 calls for a shift into a regeneration mode. In such instances, the high flow rate across the top of valve 124 creates a sufficient pressure differential so as to maintain the movable service control valve assembly 60 in the position shown in FIG. 1. Also, where such regeneration mode is signalled by metering assembly 34 during a high service rate flow, even though diaphragm 54 is open, brine will not pass through valve 56 since a greater pressure will be present on the right side of ball valve 166 than on the left side thereof. This feature, however, accomodates a "light service load" such as, for example, experienced by a leaking faucet in the system serviced by the fluid treating apparatus 20 by permitting a shift into a regeneration mode under such conditions when the meterming assembly 34 calls for such regeneration. In such "light service load" transfer of valve assembly 60 upwardly to the position shown in FIG. 2 results because the volume of water flowing past the flow responsive portion 128 of valve assembly 60 will be sufficient to overcome the combined effect of the slight pressure differential across the top of valve 124 and the weight of element 128. This feature is important since it insures regeneration even though there is a very light and possibly unknown water flow through the apparatus 20 brought about, for example as previously stated, by a leaking faucet in the system serviced by the apparatus 20 of the present invention.

It will be noted that changes to and from the foregoing cycles occur and are regulated solely by the flow of water through the apparatus, and by forces generated by fluent and static pressures of the water, without resort to electrical or other extrinsic forces to cause the unit to operate. In this regard, however, it will be appreciated that many important aspects of the present invention may advantageously be embodied in fluid treating devices wherein the flow control valves are actuated manually, electromechanically or otherwise.

Referring now to an important feature of the invention, namely an arrangement of the ion exchange particles in a novel manner so as to prevent so-called reverse exchange following regeneration, it will be noted that the upper chamber 78 in FIG. 1 contains a quantity of particles of ion exchange resin beads. In the service or treating mode of operation, the chamber 78 is downstream of the chamber 80. As shown in FIGS. 1 and 2, the quantity of ion exchange resin material in chamber 78 is substantially less than the total volume of that chamber whereas the quantity of ion exchange resin material in chamber 80 fills that chamber with the individual resin particles being in surface-to-surface contact with each other. Preferably, the ion exchange resin material in chamber 78 will also be of fine mesh size, however, if desired, somewhat larger sized particles can be used therein.

Since the smaller or more finely subdivided particles have a much more rapid exchange rate than the larger particles, the ion exchange capacity of the fine particles is gradually depleted, with the lowermost particles losing their calcium-absorbing capacity first, and the physically upper but downstream particles (in the service mode) losing their capacity to exchange calcium for sodium later. During this time, the beads or particles in the upper chamber 78 do not undergo appreciable change of form, because the beads in the lower or upstream chamber have effectively removed all calcium and other exchangeable material from the water being treated. Moreover, it will be noted that the beads in the upper chamber 78 are confined much more loosely than the beads in chamber 80, and that under conditions of service flow, the water tends to raise the beads from the felt pad, thus tending to unpack or loosen the beads.

Referring to the apparatus in the normal or service mode of operation, the particles in the upper chamber 78 may be looked upon as being very inefficient or ineffective ion exchangers since they are loosely arranged and able to be pushed away from a packed or matrix form in use by water flow therethrough. Thus, the particles in chamber 78 have very little ion exchange ability, being loosely distributed throughout the chamber 78 in the service flow mode. Of course, while in that mode these particles only come in contact with water from which substantially all the calcium has been removed.

When water flow is in the opposite direction, however, the situation in respect to the efficiency of the beads in the upper chamber is somewhat reversed. Under conditions of reverse flow, the brine, which is very concentrated, contacts the particles in chamber 78 first. The direction of water flow and the influence of gravity combine during backwash to pack the beads in chamber 78 quite tightly against one another and against the felt pad 84. Thus, whether or not the ion exchange capacity of the beads in chamber 78 has been depleted, the beads are fully regenerated by passage of the concentrated brine solution therethrough upon backwashing. Since backwashing must be followed by a rinsing cycle, however, and because the rinsing cycle necessarily is carried out with untreated water, a certain amount of hardness is taken out of the water by the beads in the upper chamber as rinsing continues. In fact, because these beads are tightly packed upon reverse flow, and because these beads are then upstream of the beads in the chamber 80, and because the rinse water is limited in quantity, the fine mesh beads in chamber 80 are essentially rinsed with soft or fully treated water after their regeneration.

After backwashing and rinsing, when the service of forward flow cycle is again initiated, calcium-sodium exchange again takes place rapidly and completely in the lower chamber. Water reaching the upper chamber 78 has sodium ions therein, while a substantial portion of the beads in the upper chamber 78 are in calcium form. If these beads were physically arranged for efficient exchange, a so-called reverse exchange, which is very undesirable, would result. In other words, the water softened in the lower chamber 80 and directed to the upper chamber 78 would be rich in sodium ions, which would undesirably be exchanged for calcium ions by the beads in the upper chamber 78 and since these calcium ions would be released into the effluent stream through line or pipe 24, the user would undesirably be confronted with an initial batch of very hard water following each regeneration.

Although the apparatus of the invention operates satisfactorily in many respects without the presence of the beads in chamber 78, a system without the construction and arrangement of these beads just described would inherently suffer from reverse exchange at the discharge end unless significantly more complex backwash and rinse cycle arrangements were provided or if, alternatively, the rinsing were accomplished with pretreated or soft water. These alternative arrangements, however, as can be well appreciated, would add significantly to the cost of manufacture and could, depending upon the particular form thereof, adversely affect the unit's reliability.

The arrangement of the beads in the upper chamber so as to render them much more efficient in ion exchange capacity in one direction than in the other direction is accordingly an important feature of the invention, especially when this arrangement is used in conjunction with the arrangement of fine mesh beads in chamber 80 as described. In this connection, however, as previously noted, the beads in the lower chamber 80 are loose in the sense that they are not physically or chemically combined into a cartridge or like structure, although they are preferably held tightly enough so that there is little or no movement of the beads relative to each other during service flow. The fine mesh particle size makes the beads in chamber 80 tend to move to a greater extent in response to fluid flow, and accordingly these beads are relatively densely packed against the upper and lower felt pads respectively during the service flow and backwash. This prevents so-called "channelling" and insures effective exchange and regeneration.

In keeping with the concept of prevent undesirable reverse exchange by the arrangement described herein, it is anticipated that a package consisting of resin beads in dual series-flow arranged chambers may be manufactured and/or packaged as a unit for replacement into a water or other fluid treating tank. Such a package would contain the pads and beads described herein, packaged within a single container and arranged to permit expansion and contraction of the fine mesh beads in the main treating bed.

Merely by way of example, such a composite wafer, cartridge or other package might consist of a ¼ inch thick bottom felt pad having a 50 micron retention capacity: a four inch thick layer of 100 to 200 mesh "Dowex 50W" ion exchange resin beads thereabove; a ¼ inch thick 50 micron retention felt pad immediately above the resin; a thin, porous, rigid member lying atop the 50 micron pad; another ¼ inch thick 50 micron retention felt pad above the rigid plate; a one-half inch axial thickness layer of "Dowex 50W" ion exchange beads of 100 to 200 mesh size above the last mentioned felt; another ¼ inch thick 50 micron retention capacity felt pad above the beads; and a thin top pad or screen lying atop the larger mesh resin beads with the distance between the rigid plates which define the upper chambers being approximately two inches. All of these elements would be held in a casing having an impermeable, generally cylindrical or tubular outer sidewall, with an inner diameter of approximately 9 ¼ inches. The finely subdivided beads would be in loose bed form in the sence that they would not be adhered to each other, chemically or mechanically, and they would be allowed to expand and contract; however, they would be sufficienly tightly confined to prevent channelling and to insure the minimum possible interstitial volume consistent with their particle size.

The principal elements just referred to would correspond substantially to those in the treating tank of FIG. 1 except that they would be packaged separately from the tank in the manner just described. This construction would provide all the advantages of the dual bed system, and would make replacement of the ion exchange material very easy.

In initially packing the main treating bed of fine mesh ion exchange particles contained in chamber 80, it is preferred that the particles be pre-dried sufficiently so that size thereof is smaller than the smallest size they will experience during use. Typically, this can be achieved by drying the beads to a 35% moisture level and then tightly packing the thus dried beads into the chamber 80. This will result in the beads, when so packed, being approximately 4% smaller than when subsequently subjected to a brine solution during regeneration. In this manner, the fine mesh beads in chamber 80 remain in a tightly packed bed at all times during use, including in particular when they are subjected to a brine solution. Expansion of the thus packed beads which, for example in the case of cation exchange resin beads occurs during the rinsing cycle, is accomodated by compression of the felt pads and, in the embodiment shown in FIGS. 1 and 2, by slight movement of the plate 86 which is biased downwardly by coil springs 90.

Referring now to another important feature of the present invention, the fluid treating apparatus and materials described have very unexpectedly demonstrated a capability of removing free water a number of undesirable constituents in addition to polyvalent metal ion hardness such as calcium and magnesium hardness, namely, the capability of removing hydrogen sulfide and other odor-causing materials, chlorine, iron, including colloidal iron, bacteria and other materials contributing undesirable color, taste, and stain-imparting characteristics to the water as well as alkalinity, which typically is representative of the concentration of dissolved solids such as carbonates and bicarbonates.

Thus, an important aspect of the present invention involves the discovery that although the cation exchange resin beads described are not normally intended by their manufacturer to provide measurable chlorine removal, regardless of their state of subdivision, such finely divided beads surprisingly are extremely effective in removing chlorine, a function which has previously been carried out by surface active materials such as activated carbon or the like. Although the inventor does not know with certainty, and does not wish to rely upon or be bound by any particular theory or mechanism of operation of the invention, it is thought possible that the ability of the materials used in carrying out the invention to remove chlorine from water, whether or not ion exchange is being simultaneously performed, appears to be accounted for by the very fine mesh size of the aggregate particles of ion exchange resin. Tests discussed in more detail below have shown that in the apparatus of the present invention fine mesh cation exchange resin beads, for example strongly acidic cation exchange resin beads having a particle size of from 100 to 200 mesh (dry), effectively remove chlorine from water over an extended period while resin beads of the same chemical charactor, but larger in size, for example 15 to 30 mesh size beads, do not provide measurable chlorine removal, either at all or within any reasonable measurable time such as a period of an hour.

To demonstrate this capability of chlorine removal, apparatus was made according to the present invention, namely, of the type generally shown in FIGS. 1–7, and water from a suburban Chicago, Illinois water system was passed through the treating apparatus. The bed of fine mesh ion exchange beads contained on sixth of a cubic foot of Dowex 50W cation exchange resin beads of 100 to 200 mesh size (dry). In one case, the unit was allowed to operate through a one-half inch pipe without stopping or undergoing regeneration at a flow rate of approximately four gallons per minute until 10,000 gallons of water had been treated. Inlet chlorine content ranged from 0.5 to 2.0 parts and outlet chlorine content, as detected by colorimetric tests, was zero indicating that 100 percent of the chlorine in the water had been removed. In this regard, it should be noted that while the test was stopped after 10,000 gallons of water had been treated, there was no indication that the ability of these same beads to provide continued chlorine removal was exhausted or diminished. Furthermore, it should also be noted that the ability of the ion exchange beads to remove chlorine did not appear to be related to the ion exchange capacity thereof. The fine mesh ion exchange bed in this test was exhausted insofar as water softening capability is concerned after treatment of approximately 400 gallons of the test water, however, this bed displayed the aforementioned chlorine removal ability in the treatment of 10,000 gallons of water without undergoing any intermittent regeneration, that is, long past the time when calcium ions were being removed from the water.

When a beaker of water from the same source was treated by placing therein larger cation exchange resin beads of the identical type ("Dowex 50W"), namely beads having a particle size of from 15 to 30 mesh, these beads, even in large quantities, failed to demonstrate the ability to remove chlorine.

Another experiment was then performed, using the same apparatus as that shown and described herein, except the treating tank was filled with the same quantity of 15 to 30 mesh "Dowex 50W" cation ion exchange beads as the ion exchange material. Water from the same source passed through an apparatus of this type likewise did not demonstrate the ability to have chlorine removed therefrom in any measurable amount.

Based on the foregoing observations and tests, it is believed that the chlorine removing ability of the material is not in any way related to the ion exchange capacity of the beads, but only to the surface area thereof.

In postulating theories or reasons which might explain the behavior of these ion-exchange beads in relation to chlorine, consideration was given as to whether the cross-linking bonds which are present in the resin beads might be subject to alteration or destruction by the action of the chlorine, perhaps by an action which would serve to oxidize these bonds. This possibility was considered in connection with the generally accepted belief that the ordinary ion exchange resins commercially available are cross-linked from 2% to 12%, with 2% cross-linkage beads being very soft, 12% cross-linked beads being very hard, and beads having 8% cross-linking being typically useful with the present invention.

However, while alteration or destruction of cross-linking, which would tend to create a less cross-linked product, is a distinct possibility, the beads examined following extensive chlorine removal did not demonstrate the change in physical properties which would seem consistent with the amount of chlorine removed; in other words, it would appear that if the postulated mechanism actually occurred, the beads would be significantly altered in physical properties by a much smaller amount of chlorine by that seemingly removed by the beads without noticeable physical change thereto.

Accordingly, although occurring for reasons not fully understood, the ability of the finely subdivided ion cation exchange beads to remove chlorine from water, irrespective of the degree of hardness of the water, and also irrespective of whether the ion exchange material ability to absorb additional calcium has been depleted or remains in its initial activity state, is a novel, unexpected and very advantageous feature of this invention.

Referring now to another prior art problem of water conditioning, a number of prior art water softening units were operative to remove calculated amounts of hardness from water, but a number of such units were very susceptible to fouling by particulates such as iron, and accordingly, if the units were to operate satisfactorily for even a substantial portion of their design or theoretical life, it was found necessary to provide separate means for removal of iron from the influent stream. With the apparatus of the present invention, however, such additional equipment is not necessary.

This is because the use of the very finely subdivided particles of the invention, particularly, when combined with the pads serving to keep the beads in place, iron fouling of the particle beds does not take place. In this connection, it is believed that the very fine particle size of the beads creates interstitial spaces which are smaller than the size of the iron particles, and accordingly, the particles can only approach the surface of the ion exchange bed, but are not able to penetrate into the bed. In addition to the use of very fine particle sizes for this purpose, the use of a relatively small bed of ion exchange particles having a need for frequent regeneration, which involves frequent backwashing, serves to remove the iron and other foreign material from the surface of the bed facing upstream, thereby keeping the bed free and clear from contaminating particles, particularly iron.

Another important advantage of the fine mesh ion exchange bed used in the present invention is the ability of such bed to remove bacteria. As is true with respect to particulate removal as noted above, it is believed that this advantage occurs by reason of the small interstitial spacing between the resin particles resulting in the bed acting as a filter which physically retains the bacteria and passes the liquid being treated.

Insofar as particulate entrapment by the bed of fine mesh ion exchange resin particles in concerned, since these beads exhibit a size change during regeneration, it follows that the flushing thereof is greatly facilitated. For example, it is known that cation exchange resin beads exhibit a slight size reduction during service as their capacity becomes depleted and a more dramatic size reducing during brining, returning to their full size during the rinse cycle. In the apparatus of the present invention, since the brining is achieved in a reverse direction (backwash) and at high flow rates, the combined effect of the bed porosity increases due to particle size reduction and high brine flow rate operate to flush all collected contaminants from the fine mesh bed with exceptional and outstanding efficiency. This is particularly true since the fine mesh size of the beads permits the use of very concentrated brine solutions which, in the case of conventionally sized ion exchange beads, e.g. 15 to 30 mesh, could not be used due to detrimental effect such concentrated brine solutions have on larger sized ion exchange beads.

Referring again to the just described feature concerning backwashing for the elimination of iron fouling, another desirable feature of the use of the very finely subdivided resin beads may be realized, that is, the ability of the apparatus of the invention to operate with a very small size bed of ion exchange material. In most, if not all prior art water softeners, the speed at which ion exchange could take place was limited because of the relatively coarse division of the ion exchange material, typically 15 to 30 mesh size. With such sizes, relatively great fluid residence times were required. Residence time within a fluid treating apparatus depends on the path traveled by the fluid, the rate at which the fluid passes the treating material, and the volume of material available for treatment. Thus, in using relatively slow acting beads, a large volume of exchange material is required, and this material must be arranged so as to have a substantial extent along the major axis of fluid travel.

Ion exchange resin bead beds of this form are not only customarily large in volume, but are characterized by relatively great pressure drop thereacross. Inasmuch as the resin beads used with the present invention are typically of the 100 to 200 mesh size and smaller, exchange is almost instantaneous and residence time is not critical, even at relatively high flow rates. Therefore, the thickness of the exchange or treating material may be as little as one inch or less, measured in the direction of water flow. The area is calculated so that a total volume sufficient to permit a reasonable duration of time between regeneration is provided. Thus, a bed of particles using only a fraction of a cubic foot of resin material, such as one-quarter to one-eighth cubic foot or less, is a size having a capability of treating 400 gallons of water of ordinary hardness, for example, but the space occupied thereby is extremely small and provides a compact installation.

A feature of the invention which is considered advantageous over and above the advantage of small size and rapid rate, exchange and regeneration resides in the arrangement of the metering unit so as to provide backwashing and regeneration within a relatively short time, or following treatment of a relatively small percentage of the total rated treating capacity of the unit. This provides means for eliminating fouling of iron, hydrogen sulfide, and other undesirable materials, and, in view of the small extent to which the resin beads have been depleted of their exchange capacity, replenishment or regeneration can be effected by the use of only a small amount of brine. Accordingly, frequent but small volume backwashings have the advantage of eliminating clogging and fouling of the unit, and, by reason of the extremely short regeneration time, provide minimum interference with normal use of the water or other fluid.

Another unexpected advantage of the use of the finely subdivided cation exchange resin beads when used in accordance with the present invention is the discovery that sulfur compounds, particularly hydrogen sulfide, can be eliminated from water which is treated therewith. Insofar as applicant is aware, no one has heretofore recognized that these sulfur compounds can be removed from water by fine mesh cation ion exchange resin particles. Accordingly, with prior art water softeners special or accessory equipment has been used to remove sulfur tasts and odors from the water. As in the case of chlorine, however, the present invention, for reasons not fully understood, also provides for effective removal of sulfur taste and odor, including the characteristically distasteful hydrogen sulfide without employing such special or auxiliary equipment. While the reasons for this behavior are not known, it is thought possible that either the sulfur compounds may be adsorbed or absorbed by the finely subdivided material. In this connection, it has been observed that the ability of these fine mesh cation exchange particles to remove sulfur compounds and other taste and odor contaminants diminishes as the cation exchange resin beads become exhausted as a result of exchange of calcium and other multi-valent ions for sodium ions. On regeneration, however, it appeared that the ability of the fine mesh cation exchange materials to remove these contaminants was fully restored due to the apparent elimination thereof during the brining and rinse cycle.

Thus, although the reasons therefor are not fully understood, an important feature of the invention is the use of finely divided cation exchange particles arranged according to the invention to remove sulfur and other unpleasant tasting materials from the water without the use of additional materials or apparatus for this purpose.

A detailed description has been made of one preferred form of the apparatus, namely the form shown in FIGS. 1–7. As will presently appear, however, a number of variations may be made to the apparatus, certain of which are preferred for some reasons, and others which, while not necessarily preferred, have certain features or advantages recommending them, such forms being merely exemplary of the variations which may be made to various parts of the unit. Accordingly, a discussion in detail of certain of these modifications and changes will now be set forth.

Referring now to FIGS. 8 and 9, modified form of treating tank assembly is shown. In this concept, a treating tank unit generally designated 240 is shown to contain an inlet fitting 242 and an outlet fitting 244, named in accordance with the direction of water flow during the treating or service mode. A divider 246 separates the tank unit 240 into separate treating chambers, with the right and left hand chambers 248, 250 each containing an elongated cylinder 252, 254 comprises respectively of top portions 256, 258, bottom ends 260, 262, and center openings or passages 264, 266 each communicating respectively with the pipe 268, 270 attached to its associated fitting 242, 244. The exterior of each cylinder 252, 254 is formed of a permeable but fine mesh felt material having a porosity sufficient to prevent passage of the fine mesh ion exchange material therethrough.

In use, as shown in FIG. 8, water flowing through the fitting 242 and line 268 will be diffused about within the chamber 248, and will flow through the small passage 272 into the lefthand chamber 250. The beads or other finely subdivided aggregate particles flow with the water into the chamber 240, but are unable to pass through the felt pad or other filter material, and accordingly collect in this chamber. Likewise, the vertical arrangement of the cylinders in each tank to each chamber 248, 240 helps prevent clogging of the felt, prevents channelling, and insures that the particles are dispersed about in the chamber for maximum exposure to the water to be treated.

FIG. 9 shows that upon reverse or backwashing flow, the aggregate particles will pass through the passage 272 into the righthand or downstream chamber 248, where they are regenerated, but are prevented from passage into the pipe or line 268. Although a construction of the type shown in FIGS. 8 and 9 does not ordinarily use two resin beds, one of very fine mesh and the other of relatively large mesh, the construction shown in FIGS. 8 and 9 is very offective when supplied with a sufficient volume of finely subdivided aggregate particles of the type used with the treating tank described in connection with construction of FIGS. 1 and 2. However, it will be appreciated that other tanks or chambers could be provided and arranged as described above to prevent or minimize undesirable reverse exchange.

Referring now to FIGS. 10 and 11, an alternate form of brino make-up system is shown to be embodied in an arrangement which includes a large brino make-up tank 300, and a smaller volume, metering and supply tank 302. As shown, the larger tank 300 includes sidewalls 304, a bottom wall 306 and perforated or foraminous, generally horizontally extending intermediate wall 308. The level of water is arranged, by a simple float control, or pressure sensitive device, or otherwise, so as to be maintained above the level of the plate 300. The remainder of the tank is filled with solid salt, with the result that a saturated solution of brine always lies beneath the plate 300. The brine make-up and supply tank includes an inlet line 310, having a chock 312 at the end thereof and an inlet fitting 314. The tank 302 is preferably cylindrical and includes vertically extending sidewalls 316 and top and bottom wall portions 318, 320. A one-way valve assembly 322 is provided near the bottom of the tank 302, and an outlet line 324 is positioned as shown somewhat above the level of the one-way valve 322. A combination piston and valve assembly 326 is disposed for movement within the tank 302, and this assembly 326 includes sealing means 328 on either end thereof, a center body portion 330, an angular central water passage 332 and a support and positioning spring 334.

In describing the brine system shown in FIGS. 10 and 11, it will be assumed that the brine system forms a part of an apparatus which is the same as the fluid treating apparatus of FIGS. 1–4. Therefore, fresh water is periodically supplied at the appropriate time to line 310, to move a measured quantity of brine from the tank 302 into the treating tank to regenerate the resin material therein. Thus, referring to FIG. 10 the piston and valve assembly 326 remains supported by the spring in the uppermost position shown in FIG. 10 in the absence of substantial water pressure in line 310.

When water is supplied to line 310 under pressure, the check valve 312 closes and passage 332 is filled with water. Because water cannot escape from the space between the piston body 330 and the walls 316 of the tank 302, inasmuch as escape is prevented by the O-rings or other seals 328, water accumulates on top of the piston in the area designated 336, forcing the piston down against the spring, and eventually meeting and/or displacing any water laying therebeneath.

The water above the piston is fresh but untreated water from line 310, while the water beneath the piston is brine which has been previously made up in the tank 302. Accordingly, there is positive displacement of the brine in the lower portion of the tank, into the line 324 and positive movement of brine to the treating tank for regeneration. During this time, valve 322 closes under the pressure developed inside the container, insuring that brine passes through the line 324. When the upper chamber 336 of the tank 302 is almost entirely filled with water, and the piston reaches the position shown in FIG. 11, the port 324 is uncovered to fresh water, and rinsing water may flow through passage 336 around the body 330 of the piston and valve assembly 326 and out the passage 324.

During this time, continued application of pressure in line 310 provides the force on the crown of the piston and valve 326 necessary to maintain it in the downward position until a desired amount of fresh water for rinsing purposes has passed through passage 332 and out the line 324. As in the construction shown in FIGS. 1-4, for example, this time is determined by a water meter or other suitable means. When the water pressure is shut off in line 310, the spring 334 acts on the piston 326, moving the same toward the top of the tank 302, and displacing the water above the piston into the brine make-up tank 300 through the check valve 312, which is appropriately biased so as to permit flow therethrough at moderate pressures, but to prohibit flow therethrough at higher or line pressures.

Accordingly, upward movement of the piston and valve 326 not only replenishes the water supply in the outer tank 300, but also draws in through valve 322 a fresh, accurately measured volume of saturated brine from the lower portion of the tank 300. Accordingly, a tank system constructed as just described is therefore fully automatic in the sense that an accurately measured quantity of brine is dispensed, and the tank is refilled, without the application of external forces other than those inherent in the flow of the fluid being treated.

Figure 12:
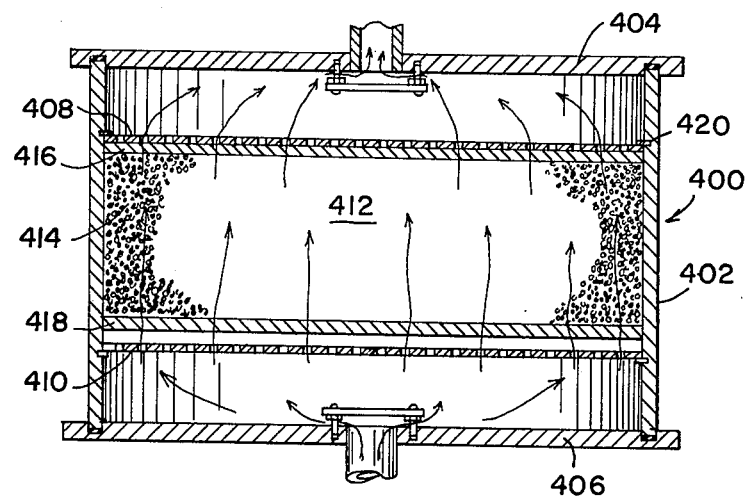
FIG. 12 is a vertical sectional view of one form of treating tank of the invention, showing the position of the loose bed of particles when subjected to service or treating flow of fluid.
Figure 13:
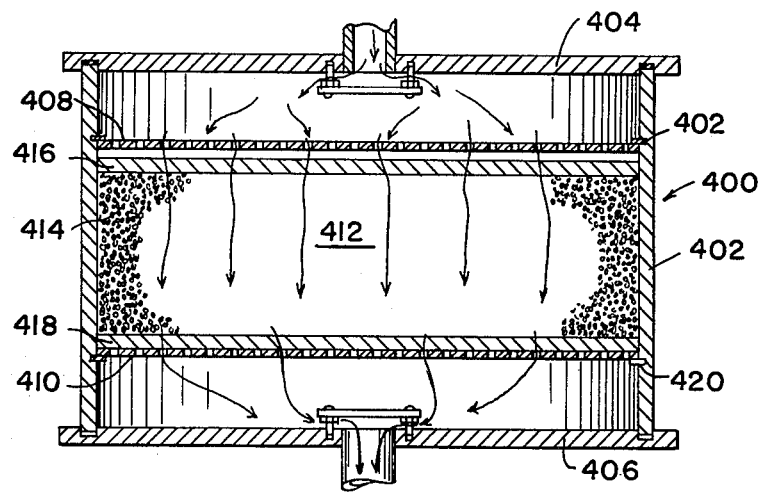
FIG. 13 is a view similar to that of FIG. 13, showing the position of the bed of particles under regeneration.

Referring now to FIGS. 12 and 13, an alternate form of treating tank is shown for use with a single size or small size range of very finely subdivided ion exchange aggregate particles. As shown in FIG. 12, a tank 400 having sidewalls 402, a top wall 404, and a bottom 406 is provided with upper and lower perforated or foraminous plates 403, 410, defining therebetween a treating chamber 412. The aggregate particles 414 in the chamber 412 are disposed between upper and lower felt pads 416, 418, and suitable means such as snap rings 420 or the like locate the plates 410, 408 against movement.

In this construction, the felt pads 416, 418 intentionally "float" with the water force, preventing the fine mesh particles from escaping from the chamber 412, but also rising upwardly as water flows in from the bottom, and sinking downwardly as regenerating brine or rinse water flows in from the top, as in FIG. 13. The felt pads 416, 418 are effective to distribute the water and to prevent "channelling", thus insuring proper flow within the chamber 412. The provision of a certain amount of axial vertical space between the pads and the plates also permits the resinous material to be in a substantially loose bed form, as this term is used herein, even when expanding as it undergoes chemical change. This reduces pressure drop and insures maximum opportunity for contact between the particles and the fluid being treated. As pointed out above, the surface area of the small particles is so great that, even in thin vertical cross-sections, residence time of even rapidly flowing water is not critical and ion exchange occurs very, very rapidly.

Referring now to FIGS. 14 and 15, a modified and preferred form of time and valve assembly is shown. As will be noted from viewing FIG. 14, representing service mode operation, the assembly 425 includes a right-hand portion 426 which comprises a gear train, water wheel, and other components identical to those described in connection with the description of the embodiment of FIGS. 5-7. Accordingly, like reference numerals have been used on those components of the FIGS. 14 and 15 embodiment which are identical in structure and operation to the previously described components in the embodiment of FIGS. 5-7. The left-hand portion of the timer and valve assembly 425, however, includes a valve assembly 428 which differs in detail from its counterpart in FIGS. 5-7. This assembly 428 includes a spool 430 which is adapted to reciprocate within a bore 432 formed within one end portion 434 of the valve housing 436. A passage 438, formed in one end 440 of the valve body 436 communicates the interior chamber 444 of valve body 436 with inlet line 192. Another passage 442 communicates the chamber 444 with line 160.

As in the construction shown in FIGS. 5-7, an axial passage 446 is provided in the body portion 448 of the spool 430. Inasmuch as the body or shank 448 is of reduced diameter in respect to the crown or fact 450 of the spool 430, if the pressure in chambers 444 and 445 is equal, that is, if equal pressure is present in lines 192 and 442, the spool will be urged to the right, since the effective area of the entire crown or face 450 is greater than that of the reverse side thereof.

Under the conditions just described, the tips of the end surface 452 of the spool body 448 engage a shoulder 454 on the valve body 436 and this, combined with the action of the seal 449, prevents flow into and through the outlet passage 456 when the timer and valve assembly is in service mode operation.

As in the case of the embodiment of FIGS. 5-7, triggering of the regeneration mode in the embodiment of FIGS. 14 and 15 is achieved by the withdrawal of the rod 176 from the body portion 448 of the spool 430. When this occurs, the passage 446 provides open communication between the inlet line 192 and outlet line 194, thereby relieving the pressure on the crown or face 450 of the spool 430 causing the spool to travel to the left into abutting engagement with the interior end face 458 of the valve body end cap 440. Accordingly, the water flows from line 192 through the passage 446 into outlet passage 456 and outwardly therefrom into outlet line 194.

During regeneration, threaded rod 176 operates in precisely the same manner as was described previously with regard to the embodiment of FIGS. 5-7, resulting in rotation and movement of the rod 176 in the opposite direction, or to the left, resulting in the rod re-entering passage 446 and the spool 458 then being returned to the service mode position shown in FIG. 14.

As previously noted, the fluid treating apparatus and method of the present invention offer significant water and salt savings when compared with conventional water softening equipment and techniques. For example, a fluid treating apparatus embodying the present invention and generally resembling the structure depicted by FIGS. 1-4, 14 and 15 and incorporating a main treating bed of about one-sixth of a cubic foot of 100 to 200 mesh cation exchange resin beads (dry basis) will require approximately three gallons of water to complete the regeneration and rinse cycle. A conventional water softener apparatus using larger ion exchange resin beads of the same chemical make-up will typically require 65 gallons of water per cubic foot of resin to complete the backwash, regeneration and rinse cycles. Accordingly, when adjustments are made for the respective quantities of ion exchange particles in each of these devices, it is significant to note that the conventional apparatus requires almost four times and much more water during backwash, regeneration and rinse as does the apparatus of the present invention.

The fine mesh ion exchange water treating apparatus also require significantly less time to complete a regeneration and rinse cycle than do commercially available devices used for the same general purposes. For example, commercially available water softening equipment commonly requires approximately one hour for backwash, regeneration and rinse while the total time for the equivalent operations in the fluid treating apparatus of the present invention will typically run from 45 seconds to one and one-half minutes.

It will be appreciated by those skilled in this art that many modifications and variations may be made without departing from the spirit and scope of the present invention. For example, in the embodiment shown in FIGS. 1-7, the springs 93 may be eliminated and the bed of fine mesh ion exchange resin beads contained between the plates 88 and 92 which would be in fixed position relative to each other to define a chamber 80 which contained the ion exchange in tightly packed surface-to-surface engagement with each other. Similarly, need for one-way check valve 162 and the portion of line 160 between that valve and diaphragm valve 54 could be eliminated by the provision of a bleed hole in diaphragm 140 of valve 52. This modification would permit inlet pressure water to close the diaphragm 140 and would enable the valves 52 and 54 and metering assembly 34 to function in the same manner as was described previously. Correspondingly, if desired, the segment of line 28 between line 32 and valve 64 can be eliminated so that the full flow of water or other fluid medium to be treated passes through the meter and flow valve control valve assembly 34. Likewise, other modifications and variations to the illustratively described embodiments will be apparent to those skilled in this art. Accordingly, the present invention is to be limited in scope only by the appended claims.

I claim:

1. An apparatus for treating fluids with an ion exchange material, said apparatus being adapted to prevent reverse ion exchange within said apparatus following regeneration and rinsing of the ion exchange resin material used therein, said apparatus comprising a first treating chamber and a second treating chamber, means for respectively interconnecting said first and second treating chambers to each other in an upstream-downstream series flow relationship when the apparatus is operating in a treating mode during which fluid to be treated passes through said second treating chamber in an upward flow direction after having previously passed through said first treating chamber and in a downstream-upstream series flow relationship to each other when said apparatus is operated in a regeneration mode during which a regenerant fluid and rinse fluid pass through said second treating chamber in a downward flow direction prior to passing through said first chamber, said first treating chamber containing a bed of 50 mesh or smaller ion exchange resin particles in a quantity sufficient to occupy substantially the entire volume of said first treating chamber, said second treating chamber containing a quantity of 50 mesh or smaller ion exchange resin particles in a quantity which occupies a volume which is substantially less than the total volume of said second treating chamber, said ion exchange particles in said second treating chamber during said treating mode being loosely distributed throughout said second treating chamber as a result of the upward flow of fluid therethrough, and during said regeneration mode said ion exchange resin particles in said second treating chamber forming a packed bed in which said particles are in surface-to-surface contact upon a lower surface of said second treating chamber as a result of gravitational forces and the downward flow of regenerant fluid and rinse fluid through said second treating chamber, whereby said ion exchange particles in said second treating chamber are characterized by a relatively efficient ion exchange ability when said apparatus is in said regeneration mode in comparison to their ion exchange ability when said apparatus is in said treating mode.

2. A method of treating fluid by ion exchange to prevent reverse exchange following regeneration and rinsing, said method comprising, passing a fluid to be treated through a first treating chamber and a second treating chamber respectively interconnected to each other in an upstream-downstream series flow relationship to each other when said apparatus is operated in a treating mode during which fluid to be treated passes through at least said second treating chamber in an upward flow direction after having previously passed through said first treating chamber and in a downstream-upstream series flow relationship to each other when said apparatus is operated in a regeneration mode during which a regenerant fluid and a rinse fluid pass through at least said second treating chamber in a downward flow direction prior to passing through said first chamber, said first treating chamber containing a bed of fine mesh ion exchange resin particles in a quantity sufficient to occupy substantially the entire volume of said first treating chamber, said second treating chamber containing a quantity of fine mesh ion exchange resin particles which is substantially less than the total volume of said second treating chamber, loosely distributing said fine mesh ion exchange particles in said second treating chamber during said treating mode operation throughout said second treating chamber as a result of the upward flow of fluid therethrough, and during said regeneration mode compacting said fine mesh ion exchange particles in said second treating chamber into a packed bed in which said particles are in surface-to-surface engagement with each other upon a lower surface of said second treating chamber as a result of gravitational forces and the downward flow of regenerant fluid and rinse fluid through said second treating chamber, whereby said fine mesh ion exchange particles in said second treating chamber provide efficient ion exchange when said apparatus is operated in said regeneration mode in comparison to the ion exchange which they provide when said apparatus is operated in said treating mode.

* * * * *

UNITED STATES PATENT AND TRADEMARK OFFICE
CERTIFICATE OF CORRECTION

PATENT NO. : 4,238,325
DATED : December 9, 1980
INVENTOR(S) : Don E. Heskett

It is certified that error appears in the above-identified patent and that said Letters Patent are hereby corrected as shown below:

```
Column 1, line 19, "mecal" should read --metal--
Column 1, line 47, "of" should read --or--
Column 4, line 42, "of" (first occurrence) should read
  --or--
Column 9, line 50, "108" should read --188--
Column 9, line 52, "170" should read --178--
Column 9, line 54, "102" should read --182--
Column 10, line 16, "very" should read --every--
Column 10, line 19, "rotion" should read --motion--
Column 11, line 9, "atom" should read --stem--
Column 11, line 10, "atom" should read --stem--
Column 11, line 20, "219" should read --218--
Column 11, line 65, "immance" should read --immense--
Column 12, line 65, "sheel" should read --wheel--
Column 13, line 52, "tis" should read --this--
Column 13, line 64, "is" should read --in--
Column 15, line 66, "of" should read --or--
Column 16, line 48, "prevent" should read --preventing--
Column 16, line 67, "icn" should read --ion--
Column 17, line 9, "sence" should read --sense--
Column 17, line 41, "90" should read --98--
Column 19, line 18, "by" should read --than--
Column 19, line 42, "place, iron" should read --place,
  precludes iron--
Column 19, line 43, delete "does not take place"
Column 19, line 48, "but" should read --and--
```

UNITED STATES PATENT AND TRADEMARK OFFICE
CERTIFICATE OF CORRECTION

PATENT NO. : 4,238,325

DATED : December 9, 1980

INVENTOR(S) : Don E. Heskett

It is certified that error appears in the above-identified patent and that said Letters Patent are hereby corrected as shown below:

(continued)

```
Column 21, line 15,  "tasts" should read --tastes--
Column 21, line 59,  "comprises" should read --comprised--
Column 22, line 28,  "brino" should read --brine--
Column 22, line 29,  "brino" should read --brine--
Column 22, line 36,  "300" should read --308--
Column 22, line 39,  "300" should read --308--
Column 22, line 40,  "chock" should read --check--
Column 23, line 50,  "403" should read --408--
Column 24, line 32,  "fact" should read --face--
Column 25, line 31,  "93" should read --98--
Column 25, line 41,  "140" should read --148--
```

Signed and Sealed this

Twentieth Day of October 1981

[SEAL]

Attest:

GERALD J. MOSSINGHOFF

Attesting Officer    Commissioner of Patents and Trademarks